US012791666B2

(12) United States Patent
Amihood et al.

(10) Patent No.: US 12,791,666 B2
(45) **Date of Patent: *Nov. 10, 2026**

(54) ADVANCED GAMING AND VIRTUAL REALITY CONTROL USING RADAR

(71) Applicant: Google LLC, Mountain View, CA (US)

(72) Inventors: Patrick M. Amihood, Palo Alto, CA (US); Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/775,115

(22) Filed: Jul. 17, 2024

(65) Prior Publication Data

US 2024/0369685 A1 Nov. 7, 2024

Related U.S. Application Data

(63) Continuation of application No. 18/312,509, filed on May 4, 2023, now Pat. No. 12,085,670, which is a (Continued)

(51) Int. Cl.

*G01S 13/04* (2006.01)
*A63F 13/21* (2014.01)

(Continued)

(52) U.S. Cl.

CPC .............. *G01S 7/415* (2013.01); *A63F 13/21* (2014.09); *A63F 13/24* (2014.09); *G01S 7/4004* (2013.01); *G01S 7/41* (2013.01); *G01S 7/412* (2013.01); *G01S 13/56* (2013.01); *G01S 13/66* (2013.01); *G01S 13/86* (2013.01); *G01S 13/867* (2013.01); *G01S 13/88* (2013.01); *G01S 13/888* (2013.01); *G01S 13/90* (2013.01); *G01S 13/904* (2019.05); *G06F 3/011* (2013.01); *G06F 3/017* (2013.01); *G06F 3/04815* (2013.01);

(Continued)

(58) Field of Classification Search

CPC .......... A63F 13/42; G01S 13/42; G01S 13/86; G01S 13/867; G01S 13/89

USPC .......................................................... 463/37

See application file for complete search history.

(56) References Cited

U.S. PATENT DOCUMENTS

| | | | |
|---|---|---|---|
| 3,570,312 | A | 3/1971 | Kreith |
| 3,610,874 | A | 10/1971 | Gagliano |

(Continued)

FOREIGN PATENT DOCUMENTS

| | | |
|---|---|---|
| CN | 1299501 | 6/2001 |
| CN | 1462382 | 12/2003 |

(Continued)

OTHER PUBLICATIONS

"Non-Final Office Action", U.S. Appl. No. 18/356,885, filed Oct. 29, 2024, 19 pages.

(Continued)

*Primary Examiner* — Michael A Cuff

(74) *Attorney, Agent, or Firm* — Colby Nipper PLLC

(57) ABSTRACT

Techniques are described herein that enable advanced gaming and virtual reality control using radar. These techniques enable small motions and displacements to be tracked, even in the millimeter or submillimeter scale, for user control actions even when those actions are optically occluded or obscured.

20 Claims, 7 Drawing Sheets

Related U.S. Application Data continuation of application No. 17/119,312, filed on Dec. 11, 2020, now Pat. No. 11,656,336, which is a continuation of application No. 16/380,245, filed on Apr. 10, 2019, now Pat. No. 10,908,696, which is a continuation of application No. 15/286,495, filed on Oct. 5, 2016, now Pat. No. 10,300,370.

(60) Provisional application No. 62/237,975, filed on Oct. 6, 2015.

(51) Int. Cl.

| | |
|---|---|
| ***A63F 13/24*** | (2014.01) |
| ***G01S 7/40*** | (2006.01) |
| ***G01S 7/41*** | (2006.01) |
| ***G01S 13/56*** | (2006.01) |
| ***G01S 13/66*** | (2006.01) |
| ***G01S 13/86*** | (2006.01) |
| ***G01S 13/88*** | (2006.01) |
| ***G01S 13/90*** | (2006.01) |
| ***G06F 3/01*** | (2006.01) |
| ***G06F 3/04815*** | (2022.01) |
| ***G06F 16/245*** | (2019.01) |
| ***G06F 18/21*** | (2023.01) |
| ***G06F 18/25*** | (2023.01) |
| ***G06F 18/28*** | (2023.01) |
| ***G06F 18/40*** | (2023.01) |
| ***G06F 21/32*** | (2013.01) |
| ***G06F 21/62*** | (2013.01) |
| ***G06N 20/00*** | (2019.01) |
| ***G06V 10/80*** | (2022.01) |
| ***G06V 20/64*** | (2022.01) |
| ***G06V 40/20*** | (2022.01) |
| ***H04Q 9/00*** | (2006.01) |
| ***H04W 4/80*** | (2018.01) |
| ***H04W 16/28*** | (2009.01) |
| *G01S 13/931* | (2020.01) |
| *G01S 19/42* | (2010.01) |
| *G06F 1/16* | (2006.01) |
| *G06F 3/0346* | (2013.01) |
| *G06F 3/0484* | (2022.01) |
| *G06F 3/16* | (2006.01) |
| *G06T 7/73* | (2017.01) |
| *G08C 17/02* | (2006.01) |

(52) U.S. Cl.

CPC .......... *G06F 16/245* (2019.01); *G06F 18/217* (2023.01); *G06F 18/25* (2023.01); *G06F 18/253* (2023.01); *G06F 18/28* (2023.01); *G06F 18/41* (2023.01); *G06F 21/32* (2013.01); *G06F 21/6245* (2013.01); *G06N 20/00* (2019.01); *G06V 10/806* (2022.01); *G06V 20/64* (2022.01); *G06V 40/28* (2022.01); *H04Q 9/00* (2013.01); *H04W 4/80* (2018.02); *H04W 16/28* (2013.01); *A63F 2300/8082* (2013.01); *G01S 13/865* (2013.01); *G01S 13/931* (2013.01); *G01S 2013/9322* (2020.01); *G01S 19/42* (2013.01); *G06F 1/163* (2013.01); *G06F 3/0346* (2013.01); *G06F 3/0484* (2013.01); *G06F 3/165* (2013.01); *G06F 2203/0384* (2013.01); *G06F 2221/2105* (2013.01); *G06T 7/75* (2017.01); *G08C 17/02* (2013.01); *G08C 2201/93* (2013.01); *H04Q 2209/883* (2013.01)

(56) References Cited

U.S. PATENT DOCUMENTS

| | | | |
|---|---|---|---|
| 3,752,017 | A | 8/1973 | Lloyd et al. |
| 3,953,706 | A | 4/1976 | Harris et al. |
| 4,104,012 | A | 8/1978 | Ferrante |
| 4,321,930 | A | 3/1982 | Jobsis et al. |
| 4,654,967 | A | 4/1987 | Thenner |
| 4,700,044 | A | 10/1987 | Hokanson et al. |
| 4,795,998 | A | 1/1989 | Dunbar et al. |
| 4,838,797 | A | 6/1989 | Dodier |
| 5,016,500 | A | 5/1991 | Conrad et al. |
| 5,024,533 | A | 6/1991 | Egawa et al. |
| 5,121,124 | A | 6/1992 | Spivey et al. |
| 5,298,715 | A | 3/1994 | Chalco et al. |
| 5,309,916 | A | 5/1994 | Hatschek |
| 5,341,979 | A | 8/1994 | Gupta |
| 5,410,471 | A | 4/1995 | Alyfuku et al. |
| 5,468,917 | A | 11/1995 | Brodsky et al. |
| 5,564,571 | A | 10/1996 | Zanotti |
| 5,656,798 | A | 8/1997 | Kubo et al. |
| 5,724,707 | A | 3/1998 | Kirk et al. |
| 5,798,798 | A | 8/1998 | Rector et al. |
| 6,032,450 | A | 3/2000 | Blum |
| 6,037,893 | A | 3/2000 | Lipman |
| 6,080,690 | A | 6/2000 | Lebby et al. |
| 6,101,431 | A | 8/2000 | Niwa et al. |
| 6,129,673 | A | 10/2000 | Fraden |
| 6,179,785 | B1 | 1/2001 | Martinosky et al. |
| 6,210,771 | B1 | 4/2001 | Post et al. |
| 6,254,544 | B1 | 7/2001 | Hayashi |
| 6,303,924 | B1 | 10/2001 | Adan et al. |
| 6,313,825 | B1 | 11/2001 | Gilbert |
| 6,340,979 | B1 | 1/2002 | Beaton et al. |
| 6,380,882 | B1 | 4/2002 | Hegnauer |
| 6,386,757 | B1 | 5/2002 | Konno |
| 6,440,593 | B2 | 8/2002 | Ellison et al. |
| 6,492,980 | B2 | 12/2002 | Sandbach |
| 6,493,933 | B1 | 12/2002 | Post et al. |
| 6,513,833 | B2 | 2/2003 | Breed et al. |
| 6,513,970 | B1 | 2/2003 | Tabata et al. |
| 6,524,239 | B1 | 2/2003 | Reed et al. |
| 6,543,668 | B1 | 4/2003 | Fujii et al. |
| 6,616,613 | B1 | 9/2003 | Goodman |
| 6,711,354 | B2 | 3/2004 | Kameyama |
| 6,717,065 | B2 | 4/2004 | Hosaka et al. |
| 6,802,720 | B2 | 10/2004 | Weiss et al. |
| 6,805,672 | B2 | 10/2004 | Martin et al. |
| 6,833,807 | B2 | 12/2004 | Flacke et al. |
| 6,835,898 | B2 | 12/2004 | Eldridge et al. |
| 6,854,985 | B1 | 2/2005 | Weiss |
| 6,929,484 | B2 | 8/2005 | Weiss et al. |
| 6,970,128 | B1 | 11/2005 | Dwelly et al. |
| 6,997,882 | B1 | 2/2006 | Parker et al. |
| 7,019,682 | B1 | 3/2006 | Louberg et al. |
| 7,134,879 | B2 | 11/2006 | Sugimoto et al. |
| 7,158,076 | B2 | 1/2007 | Fiore et al. |
| 7,164,820 | B2 | 1/2007 | Eves et al. |
| 7,194,371 | B1 | 3/2007 | McBride et al. |
| 7,205,932 | B2 | 4/2007 | Fiore |
| 7,209,775 | B2 | 4/2007 | Bae et al. |
| 7,223,105 | B2 | 5/2007 | Weiss et al. |
| 7,230,610 | B2 | 6/2007 | Jung et al. |
| 7,249,954 | B2 | 7/2007 | Weiss |
| 7,266,532 | B2 | 9/2007 | Sutton et al. |
| 7,299,964 | B2 | 11/2007 | Jayaraman et al. |
| 7,310,236 | B2 | 12/2007 | Takahashi et al. |
| 7,317,416 | B2 | 1/2008 | Flom et al. |
| 7,348,285 | B2 | 3/2008 | Dhawan et al. |
| 7,365,031 | B2 | 4/2008 | Swallow et al. |
| 7,421,061 | B2 | 9/2008 | Boese et al. |
| 7,462,035 | B2 | 12/2008 | Lee et al. |
| 7,528,082 | B2 | 5/2009 | Krans et al. |
| 7,544,627 | B2 | 6/2009 | Tao et al. |
| 7,578,195 | B2 | 8/2009 | DeAngelis et al. |
| 7,644,488 | B2 | 1/2010 | Aisenbrey |
| 7,647,093 | B2 | 1/2010 | Bojovic et al. |
| 7,670,144 | B2 | 3/2010 | Ito et al. |

(56) References Cited

U.S. PATENT DOCUMENTS

| | | | |
|---|---|---|---|
| 7,677,729 B2 | 3/2010 | Vilser et al. |
| 7,691,067 B2 | 4/2010 | Westbrook et al. |
| 7,698,154 B2 | 4/2010 | Marchosky |
| 7,750,841 B2 | 7/2010 | Oswald et al. |
| 7,791,700 B2 | 9/2010 | Bellamy |
| 7,834,276 B2 | 11/2010 | Chou et al. |
| 7,845,023 B2 | 12/2010 | Swatee |
| 7,941,676 B2 | 5/2011 | Glaser |
| 7,952,512 B1 | 5/2011 | Delker et al. |
| 7,999,722 B2 | 8/2011 | Beeri et al. |
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,193,929 B1 | 6/2012 | Siu et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,326,313 B2 | 12/2012 | McHenry et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,374,668 B1 | 2/2013 | Hayter et al. |
| 8,475,367 B1 | 7/2013 | Yuen et al. |
| 8,505,474 B2 | 8/2013 | Kang et al. |
| 8,509,882 B2 | 8/2013 | Albert et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,576,110 B2 | 11/2013 | Valentine |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,854,433 B1 | 10/2014 | Rafii |
| 8,860,602 B2 | 10/2014 | Nohara et al. |
| 8,921,473 B1 | 12/2014 | Hyman |
| 8,926,509 B2 | 1/2015 | Magar et al. |
| 8,948,839 B1 | 2/2015 | Longinotti-Buitoni et al. |
| 8,963,806 B1 | 2/2015 | Starner et al. |
| 9,055,879 B2 | 6/2015 | Selby et al. |
| 9,075,429 B1 | 7/2015 | Karakotsios et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Guofu et al. |
| 9,223,494 B1 | 12/2015 | DeSalvo et al. |
| 9,229,102 B1 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautianinen et al. |
| 9,346,167 B2 | 5/2016 | O'Connor et al. |
| 9,354,709 B1 | 5/2016 | Heller et al. |
| 9,412,273 B2 | 8/2016 | Ricci |
| 9,508,141 B2 | 11/2016 | Khachaturian et al. |
| 9,511,877 B2 | 12/2016 | Masson |
| 9,524,597 B2 | 12/2016 | Ricci |
| 9,569,001 B2 | 2/2017 | Mistry et al. |
| 9,575,560 B2 | 2/2017 | Poupyrev et al. |
| 9,582,933 B1 | 2/2017 | Mosterman et al. |
| 9,588,625 B2 | 3/2017 | Poupyrev |
| 9,594,443 B2 | 3/2017 | VanBlon et al. |
| 9,600,080 B2 | 3/2017 | Poupyrev |
| 9,693,592 B2 | 7/2017 | Robinson et al. |
| 9,699,663 B1 | 7/2017 | Jovancevic |
| 9,729,986 B2 | 8/2017 | Crawley et al. |
| 9,746,551 B2 | 8/2017 | Scholten et al. |
| 9,766,742 B2 | 9/2017 | Papakostas |
| 9,778,749 B2 | 10/2017 | Poupyrev |
| 9,807,619 B2 | 10/2017 | Tsai et al. |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,848,780 B1 | 12/2017 | DeBusschere et al. |
| 9,870,056 B1 | 1/2018 | Yao |
| 9,921,660 B2 | 3/2018 | Poupyrev |
| 9,933,908 B2 | 4/2018 | Poupyrev |
| 9,947,080 B2 | 4/2018 | Nguyen et al. |
| 9,958,541 B2 | 5/2018 | Kishigami et al. |
| 9,958,950 B2 | 5/2018 | Li |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,016,162 B1 | 7/2018 | Rogers et al. |
| 10,027,923 B1 | 7/2018 | Chang |
| 10,034,630 B2 | 7/2018 | Lee et al. |
| 10,063,427 B1 | 8/2018 | Brown |
| 10,064,582 B2 | 9/2018 | Rogers |
| 10,073,590 B2 | 9/2018 | Dascola et al. |
| 10,080,528 B2 | 9/2018 | DeBusschere et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,405 B2 | 2/2019 | Mazzaro et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 10,304,567 B2 | 5/2019 | Kitagawa et al. |
| 10,310,620 B2 | 6/2019 | Lien et al. |
| 10,310,621 B1 | 6/2019 | Lien et al. |
| 10,376,195 B1 | 8/2019 | Reid et al. |
| 10,379,621 B2 | 8/2019 | Schwesig et al. |
| 10,401,490 B2 | 9/2019 | Gillian et al. |
| 10,409,385 B2 | 9/2019 | Poupyrev |
| 10,459,080 B1 | 10/2019 | Schwesig et al. |
| 10,492,302 B2 | 11/2019 | Karagozler et al. |
| 10,496,182 B2 | 12/2019 | Lien et al. |
| 10,503,883 B1 | 12/2019 | Gillian et al. |
| 10,509,478 B2 | 12/2019 | Poupyrev et al. |
| 10,540,001 B1 | 1/2020 | Poupyrev et al. |
| 10,572,027 B2 | 2/2020 | Poupyrev et al. |
| 10,579,150 B2 | 3/2020 | Gu et al. |
| 10,642,367 B2 | 5/2020 | Poupyrev |
| 10,660,379 B2 | 5/2020 | Poupyrev et al. |
| 10,664,059 B2 | 5/2020 | Poupyrev |
| 10,664,061 B2 | 5/2020 | Poupyrev |
| 10,705,185 B1 | 7/2020 | Lien et al. |
| 10,768,712 B2 | 9/2020 | Schwesig et al. |
| 10,817,065 B1 | 10/2020 | Lien et al. |
| 10,817,070 B2 | 10/2020 | Lien et al. |
| 10,823,841 B1 | 11/2020 | Lien et al. |
| 10,908,696 B2 | 2/2021 | Amihood et al. |
| 10,908,896 B2 | 2/2021 | Lang et al. |
| 10,931,934 B2 | 2/2021 | Richards et al. |
| 10,936,081 B2 | 3/2021 | Poupyrev |
| 10,936,085 B2 | 3/2021 | Poupyrev et al. |
| 10,948,996 B2 | 3/2021 | Poupyrev et al. |
| 11,080,556 B1 | 8/2021 | Gillian et al. |
| 11,103,015 B2 | 8/2021 | Poupyrev et al. |
| 11,132,065 B2 | 9/2021 | Gillian et al. |
| 11,140,787 B2 | 10/2021 | Karagozler et al. |
| 11,169,988 B2 | 11/2021 | Poupyrev et al. |
| 11,175,743 B2 | 11/2021 | Lien et al. |
| 11,219,412 B2 | 1/2022 | Rogers et al. |

(56) References Cited

U.S. PATENT DOCUMENTS

| | | | |
|---|---|---|---|
| 11,221,682 | B2 | 1/2022 | Poupyrev |
| 11,256,335 | B2 | 2/2022 | Poupyrev et al. |
| 11,385,721 | B2 | 7/2022 | Lien et al. |
| 11,393,092 | B2 | 7/2022 | Sun et al. |
| 11,481,040 | B2 | 10/2022 | Gillian et al. |
| 11,592,909 | B2 | 2/2023 | Poupyrev et al. |
| 11,656,336 | B2 | 5/2023 | Amihood et al. |
| 11,698,438 | B2 | 7/2023 | Lien et al. |
| 11,698,439 | B2 | 7/2023 | Lien et al. |
| 11,709,552 | B2 | 7/2023 | Lien et al. |
| 11,816,101 | B2 | 11/2023 | Poupyrev et al. |
| 12,085,670 | B2 | 9/2024 | Amihood et al. |
| 12,117,560 | B2 | 10/2024 | Gillian et al. |
| 12,153,571 | B2 | 11/2024 | Poupyrev et al. |
| 12,340,028 | B2 | 6/2025 | Lien et al. |
| 2001/0030624 | A1 | 10/2001 | Schwoegler |
| 2001/0035836 | A1 | 11/2001 | Miceli et al. |
| 2002/0005778 | A1 | 1/2002 | Breed et al. |
| 2002/0009972 | A1 | 1/2002 | Amento et al. |
| 2002/0080156 | A1 | 6/2002 | Abbott et al. |
| 2002/0170897 | A1 | 11/2002 | Hall |
| 2003/0005030 | A1 | 1/2003 | Sutton et al. |
| 2003/0036685 | A1 | 2/2003 | Goodman |
| 2003/0071750 | A1 | 4/2003 | Benitz |
| 2003/0093000 | A1 | 5/2003 | Nishio et al. |
| 2003/0100228 | A1 | 5/2003 | Bungo et al. |
| 2003/0119391 | A1 | 6/2003 | Swallow et al. |
| 2003/0122677 | A1 | 7/2003 | Kail |
| 2003/0208113 | A1 | 11/2003 | Mault et al. |
| 2004/0008137 | A1 | 1/2004 | Hassebrock et al. |
| 2004/0009729 | A1 | 1/2004 | Hill et al. |
| 2004/0046736 | A1 | 3/2004 | Pryor et al. |
| 2004/0102693 | A1 | 5/2004 | Jenkins et al. |
| 2004/0157662 | A1 | 8/2004 | Tsuchiya |
| 2004/0249250 | A1 | 12/2004 | McGee et al. |
| 2004/0259391 | A1 | 12/2004 | Jung et al. |
| 2005/0069695 | A1 | 3/2005 | Jung et al. |
| 2005/0128124 | A1 | 6/2005 | Greneker et al. |
| 2005/0148876 | A1 | 7/2005 | Endoh et al. |
| 2005/0195330 | A1 | 9/2005 | Zacks |
| 2005/0231419 | A1 | 10/2005 | Mitchell |
| 2005/0267366 | A1 | 12/2005 | Murashita et al. |
| 2006/0035554 | A1 | 2/2006 | Glaser et al. |
| 2006/0040739 | A1 | 2/2006 | Wells |
| 2006/0047386 | A1 | 3/2006 | Kanevsky et al. |
| 2006/0061504 | A1 | 3/2006 | Leach et al. |
| 2006/0100517 | A1 | 5/2006 | Phillips |
| 2006/0125803 | A1 | 6/2006 | Westerman et al. |
| 2006/0136997 | A1 | 6/2006 | Telek et al. |
| 2006/0139162 | A1 | 6/2006 | Flynn |
| 2006/0139314 | A1 | 6/2006 | Bell |
| 2006/0148351 | A1 | 7/2006 | Tao et al. |
| 2006/0157734 | A1 | 7/2006 | Onodero et al. |
| 2006/0166620 | A1 | 7/2006 | Sorensen |
| 2006/0170584 | A1 | 8/2006 | Romero et al. |
| 2006/0183980 | A1 | 8/2006 | Yang |
| 2006/0209021 | A1 | 9/2006 | Yoo et al. |
| 2006/0244654 | A1 | 11/2006 | Cheng et al. |
| 2006/0258205 | A1 | 11/2006 | Locher et al. |
| 2006/0284757 | A1 | 12/2006 | Zemany |
| 2007/0024488 | A1 | 2/2007 | Zemany et al. |
| 2007/0024946 | A1 | 2/2007 | Panasyuk et al. |
| 2007/0026695 | A1 | 2/2007 | Lee et al. |
| 2007/0027369 | A1 | 2/2007 | Pagnacco et al. |
| 2007/0030195 | A1 | 2/2007 | Steinway et al. |
| 2007/0118043 | A1 | 5/2007 | Oliver et al. |
| 2007/0161921 | A1 | 7/2007 | Rausch |
| 2007/0164896 | A1 | 7/2007 | Suzuki et al. |
| 2007/0176821 | A1 | 8/2007 | Flom et al. |
| 2007/0192647 | A1 | 8/2007 | Glaser |
| 2007/0197115 | A1 | 8/2007 | Eves et al. |
| 2007/0197878 | A1 | 8/2007 | Shklarski |
| 2007/0210074 | A1 | 9/2007 | Maurer et al. |
| 2007/0237423 | A1 | 10/2007 | Tico et al. |
| 2007/0276262 | A1 | 11/2007 | Banet et al. |
| 2007/0276632 | A1 | 11/2007 | Banet et al. |
| 2008/0001735 | A1 | 1/2008 | Tran |
| 2008/0002027 | A1 | 1/2008 | Kondo et al. |
| 2008/0015422 | A1 | 1/2008 | Wessel |
| 2008/0024438 | A1 | 1/2008 | Collins et al. |
| 2008/0039731 | A1 | 2/2008 | McCombie et al. |
| 2008/0059578 | A1 | 3/2008 | Albertson et al. |
| 2008/0065291 | A1 | 3/2008 | Breed |
| 2008/0074307 | A1 | 3/2008 | Boric-Lubecke et al. |
| 2008/0122796 | A1 | 5/2008 | Jobs et al. |
| 2008/0134102 | A1 | 6/2008 | Movold et al. |
| 2008/0136775 | A1 | 6/2008 | Conant |
| 2008/0168396 | A1 | 7/2008 | Matas et al. |
| 2008/0168403 | A1 | 7/2008 | Westerman et al. |
| 2008/0194204 | A1 | 8/2008 | Duet et al. |
| 2008/0194975 | A1 | 8/2008 | MacQuarrie et al. |
| 2008/0211766 | A1 | 9/2008 | Westerman et al. |
| 2008/0233822 | A1 | 9/2008 | Swallow et al. |
| 2008/0270172 | A1 | 10/2008 | Luff et al. |
| 2008/0278450 | A1 | 11/2008 | Lashina |
| 2008/0282665 | A1 | 11/2008 | Speleers |
| 2008/0291158 | A1 | 11/2008 | Park et al. |
| 2008/0303800 | A1 | 12/2008 | Elwell |
| 2008/0316085 | A1 | 12/2008 | Rofougaran et al. |
| 2008/0320419 | A1 | 12/2008 | Matas et al. |
| 2009/0002220 | A1 | 1/2009 | Lovberg et al. |
| 2009/0018408 | A1 | 1/2009 | Ouchi et al. |
| 2009/0018428 | A1 | 1/2009 | Dias et al. |
| 2009/0033585 | A1 | 2/2009 | Lang |
| 2009/0053950 | A1 | 2/2009 | Surve |
| 2009/0056300 | A1 | 3/2009 | Chung et al. |
| 2009/0058820 | A1 | 3/2009 | Hinckley |
| 2009/0113298 | A1 | 4/2009 | Jung et al. |
| 2009/0115617 | A1 | 5/2009 | Sano et al. |
| 2009/0118648 | A1 | 5/2009 | Kandori et al. |
| 2009/0149036 | A1 | 6/2009 | Lee et al. |
| 2009/0177068 | A1 | 7/2009 | Stivoric et al. |
| 2009/0203244 | A1 | 8/2009 | Toonder |
| 2009/0226043 | A1 | 9/2009 | Angell et al. |
| 2009/0253585 | A1 | 10/2009 | Diatchenko et al. |
| 2009/0262005 | A1 | 10/2009 | Mcneill et al. |
| 2009/0270690 | A1 | 10/2009 | Roos et al. |
| 2009/0278915 | A1 | 11/2009 | Kramer et al. |
| 2009/0288762 | A1 | 11/2009 | Wolfel |
| 2009/0292468 | A1 | 11/2009 | Wu et al. |
| 2009/0295712 | A1 | 12/2009 | Ritzau |
| 2009/0299197 | A1 | 12/2009 | Antonelli et al. |
| 2009/0303100 | A1 | 12/2009 | Zemany |
| 2009/0319181 | A1 | 12/2009 | Khosravy et al. |
| 2010/0002912 | A1 | 1/2010 | Solinsky |
| 2010/0013676 | A1 | 1/2010 | Do et al. |
| 2010/0045513 | A1 | 2/2010 | Pett et al. |
| 2010/0050133 | A1 | 2/2010 | Nishihara et al. |
| 2010/0053151 | A1 | 3/2010 | Marti et al. |
| 2010/0060570 | A1 | 3/2010 | Underkoffler et al. |
| 2010/0065320 | A1 | 3/2010 | Urano |
| 2010/0069730 | A1 | 3/2010 | Bergstrom et al. |
| 2010/0071205 | A1 | 3/2010 | Graumann et al. |
| 2010/0094141 | A1 | 4/2010 | Puswella |
| 2010/0107099 | A1 | 4/2010 | Frazier et al. |
| 2010/0109938 | A1 | 5/2010 | Oswald et al. |
| 2010/0125182 | A1 | 5/2010 | Schroeter et al. |
| 2010/0152600 | A1 | 6/2010 | Droitcour et al. |
| 2010/0179820 | A1 | 7/2010 | Harrison et al. |
| 2010/0198067 | A1 | 8/2010 | Mahfouz et al. |
| 2010/0201586 | A1 | 8/2010 | Michalk |
| 2010/0202656 | A1 | 8/2010 | Ramakrishnan et al. |
| 2010/0204550 | A1 | 8/2010 | Heneghan et al. |
| 2010/0205667 | A1 | 8/2010 | Anderson et al. |
| 2010/0208035 | A1 | 8/2010 | Pinault et al. |
| 2010/0225562 | A1 | 9/2010 | Smith |
| 2010/0234094 | A1 | 9/2010 | Gagner et al. |
| 2010/0241009 | A1 | 9/2010 | Petkie |
| 2010/0281438 | A1 | 11/2010 | Latta et al. |
| 2010/0292549 | A1 | 11/2010 | Schuler |
| 2010/0306713 | A1 | 12/2010 | Geisner et al. |
| 2010/0313414 | A1 | 12/2010 | Sheats |
| 2010/0324384 | A1 | 12/2010 | Moon et al. |
| 2010/0325770 | A1 | 12/2010 | Chung et al. |

(56) References Cited

U.S. PATENT DOCUMENTS

2011/0003664 A1 1/2011 Richard
2011/0009711 A1 1/2011 Nanikashvili et al.
2011/0010014 A1 1/2011 Oexman et al.
2011/0018795 A1 1/2011 Jang
2011/0029038 A1 2/2011 Hyde et al.
2011/0073353 A1 3/2011 Lee et al.
2011/0083111 A1 4/2011 Forutanpour et al.
2011/0093820 A1 4/2011 Zhang et al.
2011/0118564 A1 5/2011 Sankai
2011/0119640 A1 5/2011 Berkes et al.
2011/0166940 A1 7/2011 Bangera et al.
2011/0181509 A1 7/2011 Rautiainen et al.
2011/0181510 A1 7/2011 Hakala et al.
2011/0193939 A1 8/2011 Vassigh et al.
2011/0197263 A1 8/2011 Stinson, III
2011/0202404 A1 8/2011 Van Der Riet
2011/0213218 A1 9/2011 Weiner et al.
2011/0221666 A1 9/2011 Newton et al.
2011/0234492 A1 9/2011 Ajmera et al.
2011/0239118 A1 9/2011 Yamaoka et al.
2011/0242305 A1 10/2011 Peterson et al.
2011/0245688 A1 10/2011 Arora et al.
2011/0279303 A1 11/2011 Smith
2011/0286585 A1 11/2011 Hodge
2011/0303341 A1 12/2011 Meiss et al.
2011/0307842 A1 12/2011 Chiang et al.
2011/0316888 A1 12/2011 Sachs et al.
2011/0318985 A1 12/2011 McDermid
2012/0001875 A1 1/2012 Li et al.
2012/0013571 A1 1/2012 Yeh et al.
2012/0017232 A1 1/2012 Hoffberg et al.
2012/0019168 A1 1/2012 Noda et al.
2012/0029369 A1 2/2012 Icove et al.
2012/0047468 A1 2/2012 Santos et al.
2012/0068876 A1 3/2012 Bangera et al.
2012/0069043 A1 3/2012 Narita et al.
2012/0075958 A1 3/2012 Hintz
2012/0092284 A1 4/2012 Rogougaran et al.
2012/0105358 A1 5/2012 Momeyer et al.
2012/0123232 A1 5/2012 Najarian et al.
2012/0127082 A1 5/2012 Kushler et al.
2012/0144934 A1 6/2012 Russell et al.
2012/0146950 A1 6/2012 Park et al.
2012/0150493 A1 6/2012 Casey et al.
2012/0154313 A1 6/2012 Au et al.
2012/0156926 A1 6/2012 Kato et al.
2012/0174299 A1 7/2012 Balzano
2012/0174736 A1 7/2012 Wang et al.
2012/0182222 A1 7/2012 Moloney
2012/0191223 A1 7/2012 Dharwada et al.
2012/0193801 A1 8/2012 Gross et al.
2012/0200600 A1 8/2012 Demaine
2012/0220835 A1 8/2012 Chung
2012/0243374 A1 9/2012 Dahl et al.
2012/0248093 A1 10/2012 Ulrich et al.
2012/0254810 A1 10/2012 Heck et al.
2012/0268310 A1 10/2012 Kim
2012/0268416 A1 10/2012 Pirogov et al.
2012/0270564 A1 10/2012 Gum et al.
2012/0276849 A1 11/2012 Hyde et al.
2012/0280900 A1 11/2012 Wang et al.
2012/0298748 A1 11/2012 Factor et al.
2012/0310665 A1 12/2012 Xu et al.
2013/0016070 A1 1/2013 Starner et al.
2013/0027218 A1 1/2013 Schwarz et al.
2013/0035563 A1 2/2013 Angellides
2013/0046544 A1 2/2013 Kay et al.
2013/0053653 A1 2/2013 Cuddihy et al.
2013/0076649 A1 3/2013 Myers et al.
2013/0076788 A1 3/2013 Ben Zvi
2013/0078624 A1 3/2013 Holmes et al.
2013/0079649 A1 3/2013 Mestha et al.
2013/0082922 A1 4/2013 Miller
2013/0083173 A1 4/2013 Geisner et al.
2013/0086533 A1 4/2013 Stienstra
2013/0096439 A1 4/2013 Lee et al.
2013/0102217 A1 4/2013 Jeon
2013/0104084 A1 4/2013 Mlyniec et al.
2013/0106710 A1 5/2013 Ashbrook
2013/0113647 A1 5/2013 Sentelle et al.
2013/0113830 A1 5/2013 Suzuki
2013/0117377 A1 5/2013 Miller
2013/0132931 A1 5/2013 Bruns et al.
2013/0147833 A1 6/2013 Aubauer et al.
2013/0150735 A1 6/2013 Cheng
2013/0154919 A1 6/2013 An et al.
2013/0161078 A1 6/2013 Li
2013/0169471 A1 7/2013 Lynch
2013/0176161 A1 7/2013 Derham et al.
2013/0176258 A1 7/2013 Dahl et al.
2013/0194173 A1 8/2013 Zhu et al.
2013/0195330 A1 8/2013 Kim et al.
2013/0196716 A1 8/2013 Khurram
2013/0207962 A1 8/2013 Oberdorfer et al.
2013/0222232 A1 8/2013 Kong et al.
2013/0229508 A1 9/2013 Li et al.
2013/0241765 A1 9/2013 Kozma et al.
2013/0245986 A1 9/2013 Grokop et al.
2013/0249793 A1 9/2013 Zhu et al.
2013/0253029 A1 9/2013 Jain et al.
2013/0260630 A1 10/2013 Ito et al.
2013/0263029 A1 10/2013 Rossi et al.
2013/0278499 A1 10/2013 Anderson
2013/0278501 A1 10/2013 Bulzacki
2013/0281024 A1 10/2013 Rofougaran et al.
2013/0283203 A1 10/2013 Batraski et al.
2013/0310700 A1 11/2013 Wiard et al.
2013/0322729 A1 12/2013 Mestha et al.
2013/0332438 A1 12/2013 Li et al.
2013/0345569 A1 12/2013 Mestha et al.
2014/0005809 A1 1/2014 Frei et al.
2014/0013417 A1 1/2014 Sakai et al.
2014/0022108 A1 1/2014 Alberth et al.
2014/0028539 A1 1/2014 Newham et al.
2014/0035737 A1 2/2014 Rashid et al.
2014/0049487 A1 2/2014 Konertz et al.
2014/0050354 A1 2/2014 Heim et al.
2014/0051941 A1 2/2014 Messerschmidt
2014/0070957 A1 3/2014 Longinotti-Buitoni et al.
2014/0072190 A1 3/2014 Wu et al.
2014/0073486 A1 3/2014 Ahmed et al.
2014/0073969 A1 3/2014 Zou et al.
2014/0081100 A1 3/2014 Muhsin et al.
2014/0095480 A1 4/2014 Marantz et al.
2014/0097979 A1 4/2014 Nohara et al.
2014/0121540 A1 5/2014 Raskin
2014/0135631 A1 5/2014 Brumback et al.
2014/0139422 A1 5/2014 Mistry et al.
2014/0139430 A1 5/2014 Leung
2014/0139616 A1 5/2014 Pinter et al.
2014/0143678 A1 5/2014 Mistry et al.
2014/0145955 A1 5/2014 Gomez et al.
2014/0149859 A1 5/2014 Van Dyken et al.
2014/0171749 A1 6/2014 Chin et al.
2014/0181509 A1 6/2014 Liu
2014/0184496 A1 7/2014 Gribetz et al.
2014/0184499 A1 7/2014 Kim
2014/0188989 A1 7/2014 Stekkelpak et al.
2014/0191939 A1 7/2014 Penn et al.
2014/0200416 A1 7/2014 Kashef et al.
2014/0201690 A1 7/2014 Holz
2014/0203080 A1 7/2014 Hintz
2014/0208275 A1 7/2014 Mongia et al.
2014/0215389 A1 7/2014 Walsh et al.
2014/0239065 A1 8/2014 Zhou et al.
2014/0244277 A1 8/2014 Krishna Rao et al.
2014/0246415 A1 9/2014 Wittkowski
2014/0247212 A1 9/2014 Kim et al.
2014/0250515 A1 9/2014 Jakobsson
2014/0253431 A1 9/2014 Gossweiler et al.
2014/0253709 A1 9/2014 Bresch et al.
2014/0262478 A1 9/2014 Harris et al.
2014/0263438 A1 9/2014 Macler
2014/0265642 A1 9/2014 Utley et al.

(56) References Cited

U.S. PATENT DOCUMENTS

2014/0266860 A1* 9/2014 Blumrosen ............ G01S 15/66 367/87
2014/0270698 A1 9/2014 Luna et al.
2014/0275854 A1 9/2014 Venkatraman et al.
2014/0276104 A1 9/2014 Tao et al.
2014/0280295 A1 9/2014 Kurochikin et al.
2014/0281975 A1 9/2014 Anderson
2014/0282877 A1 9/2014 Mahaffey et al.
2014/0297006 A1 10/2014 Sadhu
2014/0298266 A1 10/2014 Lapp
2014/0300506 A1 10/2014 Alton et al.
2014/0306936 A1 10/2014 Dahl et al.
2014/0309855 A1 10/2014 Tran
2014/0316261 A1 10/2014 Lux et al.
2014/0318699 A1 10/2014 Longinotti-Buitoni et al.
2014/0324888 A1 10/2014 Xie et al.
2014/0329567 A1 11/2014 Chan et al.
2014/0333467 A1 11/2014 Inomata
2014/0343392 A1 11/2014 Yang
2014/0347295 A1 11/2014 Kim et al.
2014/0357369 A1 12/2014 Callens et al.
2014/0368378 A1 12/2014 Crain et al.
2014/0368441 A1 12/2014 Touloumtzis
2014/0376788 A1 12/2014 Xu et al.
2015/0002391 A1 1/2015 Chen
2015/0006505 A1 1/2015 Plakhov et al.
2015/0009096 A1 1/2015 Lee et al.
2015/0026815 A1 1/2015 Barrett
2015/0029050 A1 1/2015 Driscoll et al.
2015/0030256 A1 1/2015 Brady et al.
2015/0040040 A1 2/2015 Balan et al.
2015/0046183 A1 2/2015 Cireddu
2015/0062033 A1 3/2015 Ishihara
2015/0068069 A1 3/2015 Tran et al.
2015/0077282 A1 3/2015 Mohamadi
2015/0077345 A1 3/2015 Hwang et al.
2015/0084855 A1 3/2015 Song et al.
2015/0085060 A1 3/2015 Fish et al.
2015/0091820 A1 4/2015 Rosenberg et al.
2015/0091858 A1 4/2015 Rosenberg et al.
2015/0091859 A1 4/2015 Rosenberg et al.
2015/0091903 A1 4/2015 Costello et al.
2015/0095987 A1 4/2015 Potash et al.
2015/0099941 A1 4/2015 Tran
2015/0100328 A1 4/2015 Kress et al.
2015/0106770 A1 4/2015 Shah et al.
2015/0109164 A1 4/2015 Takaki
2015/0112606 A1 4/2015 He et al.
2015/0133017 A1 5/2015 Liao et al.
2015/0143601 A1 5/2015 Longinotti-Buitoni et al.
2015/0145805 A1 5/2015 Liu
2015/0162729 A1 6/2015 Reversat et al.
2015/0177374 A1 6/2015 Driscoll et al.
2015/0177866 A1 6/2015 Hwang et al.
2015/0185314 A1 7/2015 Corcos et al.
2015/0199045 A1 7/2015 Robucci et al.
2015/0204973 A1 7/2015 Nohara et al.
2015/0205358 A1 7/2015 Lyren
2015/0223733 A1 8/2015 Al-Alusi
2015/0226004 A1 8/2015 Thompson
2015/0228099 A1 8/2015 Osterhout
2015/0229019 A1 8/2015 Osterhout et al.
2015/0229885 A1 8/2015 Offenhaeuser
2015/0256763 A1 9/2015 Niemi
2015/0257653 A1 9/2015 Hyde et al.
2015/0261320 A1 9/2015 Leto
2015/0268027 A1 9/2015 Gerdes
2015/0268799 A1 9/2015 Starner et al.
2015/0276925 A1 10/2015 Scholten et al.
2015/0277569 A1 10/2015 Sprenger et al.
2015/0278861 A1 10/2015 Osotio et al.
2015/0280102 A1 10/2015 Tajitsu et al.
2015/0285906 A1 10/2015 Hooper et al.
2015/0287187 A1 10/2015 Redtel
2015/0297105 A1 10/2015 Pahlevan et al.
2015/0301167 A1 10/2015 Sentelle et al.
2015/0312041 A1 10/2015 Choi
2015/0314780 A1 11/2015 Stenneth et al.
2015/0317518 A1 11/2015 Fujimaki et al.
2015/0323993 A1 11/2015 Levesque et al.
2015/0332075 A1 11/2015 Burch
2015/0341550 A1 11/2015 Lay
2015/0346701 A1 12/2015 Gordon et al.
2015/0346820 A1 12/2015 Poupyrev et al.
2015/0350902 A1 12/2015 Baxley et al.
2015/0351703 A1 12/2015 Phillips et al.
2015/0370250 A1 12/2015 Bachrach et al.
2015/0375339 A1 12/2015 Sterling et al.
2016/0011668 A1 1/2016 Gilad-Bachrach et al.
2016/0018948 A1 1/2016 Parvarandeh et al.
2016/0026253 A1 1/2016 Bradski et al.
2016/0026768 A1 1/2016 Singh et al.
2016/0038083 A1 2/2016 Ding et al.
2016/0041617 A1 2/2016 Poupyrev
2016/0041618 A1 2/2016 Poupyrev
2016/0042169 A1 2/2016 Polehn
2016/0045706 A1 2/2016 Gary et al.
2016/0048235 A1 2/2016 Poupyrev
2016/0048236 A1 2/2016 Poupyrev
2016/0048672 A1 2/2016 Lux et al.
2016/0054792 A1 2/2016 Poupyrev
2016/0054803 A1 2/2016 Poupyrev
2016/0054804 A1 2/2016 Gollakata et al.
2016/0055201 A1 2/2016 Poupyrev et al.
2016/0075015 A1 3/2016 Izhikevich et al.
2016/0075016 A1 3/2016 Laurent et al.
2016/0077202 A1 3/2016 Hirvonen et al.
2016/0085296 A1 3/2016 Mo et al.
2016/0089042 A1 3/2016 Saponas et al.
2016/0090839 A1 3/2016 Stolarcyzk
2016/0096270 A1 4/2016 Ibarz Gabardos et al.
2016/0098089 A1 4/2016 Poupyrev
2016/0100166 A1 4/2016 Dragne et al.
2016/0103500 A1 4/2016 Hussey et al.
2016/0106328 A1 4/2016 Mestha et al.
2016/0124579 A1 5/2016 Tokutake
2016/0131741 A1 5/2016 Park
2016/0140872 A1 5/2016 Palmer et al.
2016/0145776 A1 5/2016 Rol
2016/0146931 A1 5/2016 Rao et al.
2016/0170491 A1 6/2016 Jung
2016/0171293 A1 6/2016 Li et al.
2016/0186366 A1 6/2016 McMaster
2016/0206244 A1 7/2016 Rogers
2016/0213331 A1 7/2016 Gil et al.
2016/0216825 A1 7/2016 Forutanpour
2016/0220152 A1 8/2016 Meriheina et al.
2016/0234365 A1 8/2016 Alameh et al.
2016/0238696 A1 8/2016 Hintz
2016/0249698 A1 9/2016 Berzowska et al.
2016/0252607 A1 9/2016 Saboo et al.
2016/0252965 A1 9/2016 Mandella et al.
2016/0253044 A1 9/2016 Katz
2016/0259037 A1 9/2016 Molchanov et al.
2016/0262685 A1 9/2016 Wagner et al.
2016/0282988 A1 9/2016 Poupyrev
2016/0283101 A1 9/2016 Schwesig et al.
2016/0284436 A1 9/2016 Fukuhara et al.
2016/0287172 A1 10/2016 Morris et al.
2016/0291143 A1 10/2016 Cao et al.
2016/0299526 A1 10/2016 Inagaki et al.
2016/0306034 A1 10/2016 Trotta et al.
2016/0320852 A1 11/2016 Poupyrev
2016/0320853 A1 11/2016 Lien et al.
2016/0320854 A1 11/2016 Lien et al.
2016/0321428 A1 11/2016 Rogers
2016/0338599 A1 11/2016 DeBusschere et al.
2016/0345638 A1 12/2016 Robinson et al.
2016/0349790 A1 12/2016 Connor
2016/0349845 A1 12/2016 Poupyrev et al.
2016/0377712 A1 12/2016 Wu et al.
2017/0011210 A1 1/2017 Cheong et al.
2017/0029985 A1 2/2017 Tajitsu et al.
2017/0052618 A1 2/2017 Lee et al.

(56) References Cited

U.S. PATENT DOCUMENTS

| | | | |
|---|---|---|---|
| 2017/0060254 | A1 | 3/2017 | Molchanov et al. |
| 2017/0060298 | A1 | 3/2017 | Hwang et al. |
| 2017/0075481 | A1 | 3/2017 | Chou et al. |
| 2017/0075496 | A1 | 3/2017 | Rosenberg et al. |
| 2017/0097413 | A1 | 4/2017 | Gillian et al. |
| 2017/0097684 | A1 | 4/2017 | Lien |
| 2017/0115777 | A1 | 4/2017 | Poupyrev |
| 2017/0124407 | A1 | 5/2017 | Micks et al. |
| 2017/0125940 | A1 | 5/2017 | Karagozler et al. |
| 2017/0131395 | A1 | 5/2017 | Reynolds et al. |
| 2017/0164904 | A1 | 6/2017 | Kirenko |
| 2017/0168630 | A1 | 6/2017 | Khoshkava et al. |
| 2017/0192523 | A1 | 7/2017 | Poupyrev |
| 2017/0192629 | A1 | 7/2017 | Takada et al. |
| 2017/0196513 | A1 | 7/2017 | Longinotti-Buitoni et al. |
| 2017/0224280 | A1 | 8/2017 | Bozkurt et al. |
| 2017/0231089 | A1 | 8/2017 | Van Keymeulen |
| 2017/0232538 | A1 | 8/2017 | Robinson et al. |
| 2017/0233903 | A1 | 8/2017 | Jeon |
| 2017/0249033 | A1 | 8/2017 | Podhajny et al. |
| 2017/0258366 | A1 | 9/2017 | Tupin et al. |
| 2017/0291301 | A1 | 10/2017 | Gabardos et al. |
| 2017/0322633 | A1 | 11/2017 | Shen et al. |
| 2017/0325337 | A1 | 11/2017 | Karagozler et al. |
| 2017/0325518 | A1 | 11/2017 | Poupyrev et al. |
| 2017/0329412 | A1 | 11/2017 | Schwesig et al. |
| 2017/0329425 | A1 | 11/2017 | Karagozler et al. |
| 2017/0356992 | A1 | 12/2017 | Scholten et al. |
| 2018/0000354 | A1 | 1/2018 | DeBusschere et al. |
| 2018/0000355 | A1 | 1/2018 | DeBusschere et al. |
| 2018/0004301 | A1 | 1/2018 | Poupyrev |
| 2018/0005766 | A1 | 1/2018 | Fairbanks et al. |
| 2018/0046258 | A1 | 2/2018 | Poupyrev |
| 2018/0095541 | A1 | 4/2018 | Gribetz et al. |
| 2018/0106897 | A1 | 4/2018 | Shouldice et al. |
| 2018/0113032 | A1 | 4/2018 | Dickey et al. |
| 2018/0157330 | A1 | 6/2018 | Gu et al. |
| 2018/0160943 | A1 | 6/2018 | Fyfe et al. |
| 2018/0177464 | A1 | 6/2018 | DeBusschere et al. |
| 2018/0196527 | A1 | 7/2018 | Poupyrev et al. |
| 2018/0256106 | A1 | 9/2018 | Rogers et al. |
| 2018/0296163 | A1 | 10/2018 | DeBusschere et al. |
| 2018/0321841 | A1 | 11/2018 | Lapp |
| 2019/0030713 | A1 | 1/2019 | Gabardos et al. |
| 2019/0033981 | A1 | 1/2019 | Poupyrev |
| 2019/0138109 | A1 | 5/2019 | Poupyrev et al. |
| 2019/0155396 | A1 | 5/2019 | Lien et al. |
| 2019/0208837 | A1 | 7/2019 | Poupyrev et al. |
| 2019/0232156 | A1 | 8/2019 | Amihood et al. |
| 2019/0243464 | A1 | 8/2019 | Lien et al. |
| 2019/0257939 | A1 | 8/2019 | Schwesig et al. |
| 2019/0278379 | A1 | 9/2019 | Gribetz et al. |
| 2019/0321719 | A1 | 10/2019 | Gillian et al. |
| 2019/0391667 | A1 | 12/2019 | Poupyrev |
| 2019/0394884 | A1 | 12/2019 | Karagozler et al. |
| 2020/0064471 | A1 | 2/2020 | Gatland et al. |
| 2020/0064924 | A1 | 2/2020 | Poupyrev et al. |
| 2020/0089314 | A1 | 3/2020 | Poupyrev et al. |
| 2020/0150776 | A1 | 5/2020 | Poupyrev et al. |
| 2020/0218361 | A1 | 7/2020 | Poupyrev |
| 2020/0229515 | A1 | 7/2020 | Poupyrev et al. |
| 2020/0264765 | A1 | 8/2020 | Poupyrev et al. |
| 2020/0278422 | A1 | 9/2020 | Lien et al. |
| 2020/0326708 | A1 | 10/2020 | Wang et al. |
| 2020/0393912 | A1 | 12/2020 | Lien et al. |
| 2020/0409472 | A1 | 12/2020 | Lien et al. |
| 2021/0096653 | A1 | 4/2021 | Amihood et al. |
| 2021/0132702 | A1 | 5/2021 | Poupyrev |
| 2021/0326642 | A1 | 10/2021 | Gillian et al. |
| 2021/0365124 | A1 | 11/2021 | Gillian et al. |
| 2022/0019291 | A1 | 1/2022 | Lien et al. |
| 2022/0043519 | A1 | 2/2022 | Poupyrev et al. |
| 2022/0058188 | A1 | 2/2022 | Poupyrev et al. |
| 2022/0066567 | A1 | 3/2022 | Lien et al. |
| 2022/0066568 | A1 | 3/2022 | Lien et al. |
| 2023/0273298 | A1 | 8/2023 | Amihood et al. |
| 2023/0367400 | A1 | 11/2023 | Lien et al. |
| 2024/0054126 | A1 | 2/2024 | Poupyrev et al. |
| 2025/0077508 | A1 | 3/2025 | Poupyrev et al. |

FOREIGN PATENT DOCUMENTS

| | | |
|---|---|---|
| CN | 1862601 | 11/2006 |
| CN | 101349943 | 1/2009 |
| CN | 101437442 | 5/2009 |
| CN | 101636711 | 1/2010 |
| CN | 101655561 | 2/2010 |
| CN | 101751126 | 6/2010 |
| CN | 101910781 | 12/2010 |
| CN | 102031615 | 4/2011 |
| CN | 102160471 | 8/2011 |
| CN | 102184020 | 9/2011 |
| CN | 102414641 | 4/2012 |
| CN | 102473032 | 5/2012 |
| CN | 102782612 | 11/2012 |
| CN | 102819315 | 12/2012 |
| CN | 102893327 | 1/2013 |
| CN | 106342197 | 2/2013 |
| CN | 202887794 | 4/2013 |
| CN | 103076911 | 5/2013 |
| CN | 103091667 | 5/2013 |
| CN | 103119469 | 5/2013 |
| CN | 103502911 | 1/2014 |
| CN | 103534664 | 1/2014 |
| CN | 102660988 | 3/2014 |
| CN | 103675868 | 3/2014 |
| CN | 103907405 | 7/2014 |
| CN | 103926584 | 7/2014 |
| CN | 104035552 | 9/2014 |
| CN | 104094194 | 10/2014 |
| CN | 104115118 | 10/2014 |
| CN | 104246659 A | 12/2014 |
| CN | 104470781 | 3/2015 |
| CN | 104685432 | 6/2015 |
| CN | 104838336 | 8/2015 |
| CN | 103355860 | 1/2016 |
| CN | 106154270 | 11/2016 |
| DE | 10011263 | 9/2001 |
| DE | 102011075725 | 11/2012 |
| DE | 102013201259 | 7/2014 |
| DE | 102013201359 | 7/2014 |
| EP | 0161895 | 11/1985 |
| EP | 1785744 | 5/2007 |
| EP | 1815788 | 8/2007 |
| EP | 2177017 | 4/2010 |
| EP | 2417908 | 2/2012 |
| EP | 2637081 | 9/2013 |
| EP | 2770408 | 8/2014 |
| EP | 2014165476 | 10/2014 |
| EP | 2953007 | 12/2015 |
| EP | 2923642 | 3/2017 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | H11168268 | 6/1999 |
| JP | H11237477 | 8/1999 |
| JP | 2001208828 | 8/2001 |
| JP | 2003500759 | 1/2003 |
| JP | 2003280049 | 10/2003 |
| JP | 2005231450 | 9/2005 |
| JP | 2006514382 | 4/2006 |
| JP | 2006163886 | 6/2006 |
| JP | 2006234716 | 9/2006 |
| JP | 2007011873 | 1/2007 |
| JP | 2007132768 | 5/2007 |
| JP | 2007266772 | 10/2007 |
| JP | 2007333385 | 12/2007 |
| JP | 2008287714 | 11/2008 |
| JP | 2008293501 | 12/2008 |
| JP | 2009037434 | 2/2009 |
| JP | 2010048583 | 3/2010 |

(56) References Cited

FOREIGN PATENT DOCUMENTS

| | | |
|---|---|---|
| JP | 2010049583 | 3/2010 |
| JP | 2011003202 | 1/2011 |
| JP | 2011086114 | 4/2011 |
| JP | 2011102457 | 5/2011 |
| JP | 2011253241 | 12/2011 |
| JP | 2012068854 | 4/2012 |
| JP | 201218583. | 9/2012 |
| JP | 2012185833 | 9/2012 |
| JP | 2012198916 | 10/2012 |
| JP | 2012208714 | 10/2012 |
| JP | 2013016060 | 1/2013 |
| JP | 2013037674 | 2/2013 |
| JP | 2013196047 | 9/2013 |
| JP | 2013251913 | 12/2013 |
| JP | 2014503873 | 2/2014 |
| JP | 2014532332 | 12/2014 |
| JP | 2015507263 | 3/2015 |
| JP | 2015509634 | 3/2015 |
| JP | 2021085256 | 6/2021 |
| KR | 1020080102516 | 11/2008 |
| KR | 100987650 | 10/2010 |
| KR | 20130045222 | 5/2013 |
| KR | 20130137005 | 12/2013 |
| KR | 1020130137005 | 12/2013 |
| KR | 20140027837 | 3/2014 |
| KR | 20140053988 | 5/2014 |
| KR | 1020140055985 | 5/2014 |
| KR | 20140138779 | 12/2014 |
| KR | 20150002718 | 1/2015 |
| KR | 101999712 | 1/2017 |
| KR | 101914850 | 10/2018 |
| TW | 201425974 | 7/2014 |
| WO | 9001895 | 3/1990 |
| WO | 0130123 | 4/2001 |
| WO | 2001027855 | 4/2001 |
| WO | 0175778 | 10/2001 |
| WO | 2002082999 | 10/2002 |
| WO | 2004004557 | 1/2004 |
| WO | 2004053601 | 6/2004 |
| WO | 2005033387 | 4/2005 |
| WO | 2005103863 | 11/2005 |
| WO | 2007125298 | 11/2007 |
| WO | 2008061385 | 5/2008 |
| WO | 2009032073 | 3/2009 |
| WO | 2009083467 | 7/2009 |
| WO | 2009148064 | 12/2009 |
| WO | 2010032173 | 3/2010 |
| WO | 2010101697 | 9/2010 |
| WO | 2012026013 | 3/2012 |
| WO | 2012064847 | 5/2012 |
| WO | 2012152476 | 11/2012 |
| WO | 2013082806 | 6/2013 |
| WO | 2013084108 | 6/2013 |
| WO | 2013137412 | 9/2013 |
| WO | 2013154864 | 10/2013 |
| WO | 2013186696 | 12/2013 |
| WO | 2013191657 | 12/2013 |
| WO | 2013192166 | 12/2013 |
| WO | 2014019085 | 2/2014 |
| WO | 2014032984 | 3/2014 |
| WO | 2014085369 | 6/2014 |
| WO | 2014116968 | 7/2014 |
| WO | 2014124520 | 8/2014 |
| WO | 2014136027 | 9/2014 |
| WO | 2014138280 | 9/2014 |
| WO | 2014160893 | 10/2014 |
| WO | 2014165476 | 10/2014 |
| WO | 2014204323 | 12/2014 |
| WO | 2015017931 | 2/2015 |
| WO | 2015018675 | 2/2015 |
| WO | 2015022671 | 2/2015 |
| WO | 2015099796 | 7/2015 |
| WO | 2015149049 | 10/2015 |
| WO | 2016053624 | 4/2016 |
| WO | 2016118534 | 7/2016 |
| WO | 2016154560 | 9/2016 |
| WO | 2016154568 | 9/2016 |
| WO | 2016176471 | 11/2016 |
| WO | 2016176600 | 11/2016 |
| WO | 2016176606 | 11/2016 |
| WO | 2016178797 | 11/2016 |
| WO | 2017019299 | 2/2017 |
| WO | 2017062566 | 4/2017 |
| WO | 2017079484 | 5/2017 |
| WO | 2017200570 | 11/2017 |
| WO | 2017200571 | 11/2017 |
| WO | 20170200949 | 11/2017 |
| WO | 2018106306 | 6/2018 |

OTHER PUBLICATIONS

Kim, et al., "Human Activity Classification Based on Micro-Doppler Signatures Using a Support Vector Machine", IEEE Transactions on Geoscience and Remote Sensing, vol. 47, No. 5, May 2009, pp. 1328-1337, 10 pages.

"Notice of Allowance", U.S. Appl. No. 18/356,885, filed Feb. 26, 2025, 8 pages.

Fairchild, et al., "Determining human target facing orientation using bistatic radar micro-Doppler signals", Jun. 2014, 9 pages.

Fairchild, et al., "Multistatic micro-doppler radar for determining target orientation and activity classification", Feb. 2016, 10 pages.

Yang, et al., "Classify human motions using micro-Doppler radar", Mar. 2008, 8 pages.

"Foreign Office Action", EP Application No. 16784352.3, Sep. 26, 2024, 5 pages.

"Notice of Allowance", U.S. Appl. No. 18/495,648, filed Jul. 22, 2024, 8 pages.

"Non-Final Office Action", U.S. Appl. No. 18/952,779, filed Sep. 29, 2025, 9 pages.

"Advisory Action", U.S. Appl. No. 16/689,519, Jun. 30, 2021, 2 pages.

"Advisory Action", U.S. Appl. No. 14/504,139, Aug. 28, 2017, 3 pages.

"Advisory Action", U.S. Appl. No. 15/704,825, Feb. 10, 2021, 4 pages.

"Apple Watch Used Four Sensors to Detect your Pulse", , Sep. 9, 2014.

"Cardiio", Retrieved From: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.

"Clever Toilet Checks on Your Health", CNN.Com; Technology, Jun. 28, 2005, 2 pages.

"Combined Search and Examination Report", GB Application No. 1620892.8, Apr. 6, 2017, 5 pages.

"Combined Search and Examination Report", GB Application No. 1620891.0, May 31, 2017, 9 pages.

"EP Appeal Decision", EP Application No. 10194359.5, May 28, 2019, 20 pages.

"European Search Report", EP Application No. 16789735.4, Nov. 14, 2018, 4 pages.

"Extended European Search Report", EP Application No. 19164113.3, Jun. 13, 2019, 11 pages.

"Extended European Search Report", EP Application No. 15170577.9, Nov. 5, 2015, 12 pages.

"Extended European Search Report", EP Application No. 21156948.8, Aug. 27, 2021, 15 pages.

"Extended European Search Report", EP Application No. 19158625.4, May 8, 2019, 16 pages.

"Extended European Search Report", EP Application No. 20174555.1, Oct. 13, 2020, 9 pages.

"Final Office Action", U.S. Appl. No. 15/462,957, filed Nov. 8, 2019, 10 Pages.

"Final Office Action", U.S. Appl. No. 14/504,061, Mar. 9, 2016, 10 pages.

"Final Office Action", U.S. Appl. No. 14/681,625, Dec. 7, 2016, 10 pages.

(56) References Cited

OTHER PUBLICATIONS

"Final Office Action", U.S. Appl. No. 15/287,253, Apr. 2, 2019, 10 pages.
"Final Office Action", U.S. Appl. No. 15/398,147, Jun. 30, 2017, 11 pages.
"Final Office Action", U.S. Appl. No. 15/287,155, Apr. 10, 2019, 11 pages.
"Final Office Action", U.S. Appl. No. 17/023,122, Apr. 7, 2022, 12 pages.
"Final Office Action", U.S. Appl. No. 14/959,799, Jul. 19, 2017, 12 pages.
"Final Office Action", U.S. Appl. No. 14/731,195, Oct. 11, 2018, 12 pages.
"Final Office Action", U.S. Appl. No. 16/689,519, Apr. 29, 2021, 13 pages.
"Final Office Action", U.S. Appl. No. 15/595,649, May 23, 2018, 13 pages.
"Final Office Action", U.S. Appl. No. 14/715,454, Sep. 7, 2017, 14 pages.
"Final Office Action", U.S. Appl. No. 16/503,234, Dec. 30, 2020, 14 pages.
"Final Office Action", U.S. Appl. No. 14/504,139, May 1, 2018, 14 pages.
"Final Office Action", U.S. Appl. No. 15/286,512, Dec. 26, 2018, 15 pages.
"Final Office Action", U.S. Appl. No. 15/142,619, Feb. 8, 2018, 15 pages.
"Final Office Action", U.S. Appl. No. 16/238,464, Jul. 25, 2019, 15 pages.
"Final Office Action", U.S. Appl. No. 15/287,359, Feb. 19, 2020, 16 Pages.
"Final Office Action", U.S. Appl. No. 14/504,121, Aug. 8, 2017, 16 pages.
"Final Office Action", U.S. Appl. No. 14/959,730, Nov. 22, 2017, 16 pages.
"Final Office Action", U.S. Appl. No. 15/142,689, Jun. 1, 2018, 16 pages.
"Final Office Action", U.S. Appl. No. 14/959,799, Jan. 4, 2018, 17 pages.
"Final Office Action", U.S. Appl. No. 14/720,632, Jan. 9, 2018, 18 pages.
"Final Office Action", U.S. Appl. No. 15/704,825, Nov. 23, 2020, 18 pages.
"Final Office Action", U.S. Appl. No. 14/518,863, May 5, 2017, 18 pages.
"Final Office Action", U.S. Appl. No. 14/959,901, May 30, 2019, 18 pages.
"Final Office Action", U.S. Appl. No. 14/959,901, Aug. 25, 2017, 19 pages.
"Final Office Action", U.S. Appl. No. 15/093,533, Mar. 21, 2018, 19 pages.
"Final Office Action", U.S. Appl. No. 14/715,454, Apr. 17, 2018, 19 pages.
"Final Office Action", U.S. Appl. No. 15/286,537, Apr. 19, 2019, 21 pages.
"Final Office Action", U.S. Appl. No. 14/518,863, Apr. 5, 2018, 21 pages.
"Final Office Action", U.S. Appl. No. 15/596,702, Jun. 13, 2019, 21 pages.
"Final Office Action", U.S. Appl. No. 14/959,901, Jun. 15, 2018, 21 pages.
"Final Office Action", U.S. Appl. No. 15/287,308, Feb. 8, 2019, 23 pages.
"Final Office Action", U.S. Appl. No. 14/599,954, Aug. 10, 2016, 23 pages.
"Final Office Action", U.S. Appl. No. 14/504,038, Sep. 27, 2016, 23 pages.
"Final Office Action", U.S. Appl. No. 14/504,121, Jul. 9, 2018, 23 pages.
"Final Office Action", U.S. Appl. No. 15/286,152, Jun. 26, 2018, 25 pages.
"Final Office Action", U.S. Appl. No. 15/704,615, filed Dec. 11, 2020, 26 pages.
"Final Office Action", U.S. Appl. No. 15/142,471, Jun. 20, 2019, 26 pages.
"Final Office Action", U.S. Appl. No. 15/596,702, Apr. 14, 2020, 27 Pages.
"Final Office Action", U.S. Appl. No. 15/403,066, Oct. 5, 2017, 31 pages.
"Final Office Action", U.S. Appl. No. 15/267,181, Jun. 7, 2018, 31 pages.
"Final Office Action", U.S. Appl. No. 14/312,486, Jun. 3, 2016, 32 pages.
"Final Office Action", U.S. Appl. No. 15/166,198, Sep. 27, 2018, 33 pages.
"Final Office Action", U.S. Appl. No. 15/287,394, Sep. 30, 2019, 38 Pages.
"Final Office Action", U.S. Appl. No. 14/699,181, May 4, 2018, 41 pages.
"Final Office Action", U.S. Appl. No. 14/715,793, Sep. 12, 2017, 7 pages.
"Final Office Action", U.S. Appl. No. 14/809,901, Dec. 13, 2018, 7 pages.
"Final Office Action", KR Application No. 10-2016-7036023, Feb. 19, 2018, 8 pages.
"Final Office Action", U.S. Appl. No. 14/874,955, Jun. 30, 2017, 9 pages.
"Final Office Action", U.S. Appl. No. 17/394,241, filed May 22, 2024, 9 pages.
"Final Office Action", U.S. Appl. No. 14/874,955, Jun. 11, 2018, 9 pages.
"First Action Interview OA", U.S. Appl. No. 14/715,793, Jun. 21, 2017, 3 pages.
"First Action Interview Office Action", U.S. Appl. No. 15/142,471, Feb. 5, 2019, 29 pages.
"First Action Interview Office Action", U.S. Appl. No. 16/080,293, Jul. 23, 2020, 3 Pages.
"First Action Interview Office Action", U.S. Appl. No. 14/959,901, Apr. 14, 2017, 3 pages.
"First Action Interview Office Action", U.S. Appl. No. 14/731,195, Jun. 21, 2018, 4 pages.
"First Action Interview Office Action", U.S. Appl. No. 15/286,152, Mar. 1, 2018, 5 pages.
"First Action Interview Office Action", U.S. Appl. No. 15/917,238, Jun. 6, 2019, 6 pages.
"First Action Interview Office Action", U.S. Appl. No. 15/166,198, Apr. 25, 2018, 8 pages.
"First Action Interview Pilot Program Pre-Interview Communication", U.S. Appl. No. 14/731,195, Aug. 1, 2017, 3 pages.
"First Exam Report", EP Application No. 15754352.1, Mar. 5, 2018, 7 pages.
"First Examination Report", GB Application No. 1621332.4, May 16, 2017, 7 pages.
"Foreign Notice of Allowance", KR Application No. 10-2021-7009474, Sep. 2, 2021, 2 pages.
"Foreign Notice of Allowance", KR Application No. 10-2021-7011901, Oct. 12, 2021, 3 pages.
"Foreign Office Action", CN Application No. 201680006327.7, Nov. 13, 2020.
"Foreign Office Action", KR Application No. 10-2018-7029464, Oct. 30, 2018, 1 page.
"Foreign Office Action", CN Application No. 202010090233.0, Mar. 31, 2023, 10 pages.
"Foreign Office Action", KR Application No. 10-2016-7036023, Aug. 11, 2017, 10 pages.
"Foreign Office Action", CN Application No. 201680020123.9, Nov. 29, 2019, 10 pages.
"Foreign Office Action", CN Application No. 201580034908.7, Feb. 19, 2019, 10 pages.
"Foreign Office Action", CN Application No. 201611159602.7, Jul. 23, 2020, 10 pages.

(56) References Cited

OTHER PUBLICATIONS

"Foreign Office Action", CN Application No. 201611191179.9, Aug. 28, 2019, 10 pages.
"Foreign Office Action", KR Application No. 10-2021-7007454, Apr. 29, 2021, 11 pages.
"Foreign Office Action", CN Application No. 201710922856.8, Jun. 19, 2020, 11 pages.
"Foreign Office Action", JP Application No. 2018-501256, Jul. 24, 2018, 11 pages.
"Foreign Office Action", JP Application No. 2019-078554, Jul. 21, 2020, 12 pages.
"Foreign Office Action", KR Application No. 10-2016-7036396, Jan. 3, 2018, 12 pages.
"Foreign Office Action", CN Application No. 202010090233.0, Dec. 28, 2023, 12 pages.
"Foreign Office Action", JP Application No. 2021-85256, Nov. 15, 2022, 13 pages.
"Foreign Office Action", CN Application No. 201580036075.8, Jul. 4, 2018, 14 page.
"Foreign Office Action", EP Application No. 16725269.1, Nov. 26, 2018, 14 pages.
"Foreign Office Action", CN Application No. 201680021212.5, Sep. 3, 2019, 14 pages.
"Foreign Office Action", JP Application No. 2016-563979, Sep. 21, 2017, 15 pages.
"Foreign Office Action", KR Application No. 10-2018-7027694, Nov. 23, 2018, 15 pages.
"Foreign Office Action", CN Application No. 201611159870.9, Dec. 17, 2019, 15 pages.
"Foreign Office Action", EP Application No. 16725269.1, Mar. 24, 2020, 15 pages.
"Foreign Office Action", JP Application No. 2020027181, Nov. 17, 2020, 16 pages.
"Foreign Office Action", CN Application No. 201580034908.7, Jul. 3, 2018, 17 pages.
"Foreign Office Action", CN Application No. 201910587123.2, Oct. 20, 2022, 17 pages.
"Foreign Office Action", CN Application No. 201510300495.4, Jun. 21, 2018, 18 pages.
"Foreign Office Action", CN Application No. 201680020567.2, Sep. 26, 2019, 19 pages.
"Foreign Office Action", KR Application No. 10-2019-7004803, Oct. 14, 2019, 2 pages.
"Foreign Office Action", KR Application No. 10-2019-7004803, Dec. 6, 2019, 2 pages.
"Foreign Office Action", CN Application No. 201611159602.7, Oct. 11, 2019, 20 pages.
"Foreign Office Action", CN Application No. 201580035246.5, Jan. 31, 2019, 22 pages.
"Foreign Office Action", CN Application No. 201680021213.X, Oct. 28, 2019, 26 pages.
"Foreign Office Action", EP Application No. 16725269.1, Feb. 9, 2021, 26 pages.
"Foreign Office Action", CN Application No. 201680038897.4, Jun. 29, 2020, 28 pages.
"Foreign Office Action", JP Application No. 2018156138, May 22, 2019, 3 pages.
"Foreign Office Action", EP Application No. 21156948.8, Jun. 26, 2024, 3 pages.
"Foreign Office Action", GB Application No. 1621191.4, Sep. 10, 2021, 3 pages.
"Foreign Office Action", JP Application No. 2018156138, Sep. 30, 2019, 3 pages.
"Foreign Office Action", KR Application No. 10-2016-7036015, Oct. 15, 2018, 3 pages.
"Foreign Office Action", GB Application No. 1621332.4, Nov. 6, 2019, 3 pages.
"Foreign Office Action", JP Application No. 2018501256, Feb. 26, 2019, 3 pages.
"Foreign Office Action", JP Application No. 2018156138, Apr. 22, 2020, 3 pages.
"Foreign Office Action", JP Application No. 2016-567839, Apr. 3, 2018, 3 pages.
"Foreign Office Action", JP Application No. 2018-021296, Apr. 9, 2019, 3 pages.
"Foreign Office Action", EP Application No. 16784352.3, May 16, 2018, 3 pages.
"Foreign Office Action", JP Application No. 2016-563979, May 21, 2018, 3 pages.
"Foreign Office Action", CN Application No. 201721290290.3, Jun. 6, 2018, 3 pages.
"Foreign Office Action", CN Application No. 201680038897.4, Feb. 1, 2021, 30 pages.
"Foreign Office Action", EP Application No. 15170577.9, Dec. 21, 2018, 31 pages.
"Foreign Office Action", GB Application No. 1621191.4, Jun. 23, 2021, 4 pages.
"Foreign Office Action", JP Application No. 2016-575564, Jan. 10, 2019, 4 pages.
"Foreign Office Action", GB Application No. 1621191.4, Dec. 31, 2020, 4 pages.
"Foreign Office Action", CN Application No. 201721290290.3, Mar. 9, 2018, 4 pages.
"Foreign Office Action", KR Application No. 10-2016-7036023, Apr. 12, 2018, 4 pages.
"Foreign Office Action", JP Application No. 2016-575564, Jul. 10, 2018, 4 pages.
"Foreign Office Action", KR Application No. 10-2021-7009474, May 10, 2021, 5 pages.
"Foreign Office Action", KR Application No. 1020217011901, Jun. 4, 2021, 5 pages.
"Foreign Office Action", GB Application No. 1621192.2, Jun. 17, 2020, 5 pages.
"Foreign Office Action", KR Application No. 10-2016-7035397, Sep. 20, 2017, 5 pages.
"Foreign Office Action", JP Application No. 2018169008, Jan. 14, 2020, 5 pages.
"Foreign Office Action", JP Application No. 2018501256, Oct. 23, 2019, 5 pages.
"Foreign Office Action", KR Application No. 10-2017-7027877, Nov. 23, 2018, 5 pages.
"Foreign Office Action", JP Application No. 2017-541972, Nov. 27, 18, 5 pages.
"Foreign Office Action", EP Application No. 16784352.3, Nov. 29, 2022, 5 pages.
"Foreign Office Action", EP Application No. 15754352.1, Nov. 7, 2018, 5 pages.
"Foreign Office Action", EP Application No. 16784352.3, Dec. 9, 2020, 5 pages.
"Foreign Office Action", EP Application No. 16789735.4, Dec. 12, 2018, 5 pages.
"Foreign Office Action", JP Application No. 2016-575564, Dec. 5, 2017, 5 pages.
"Foreign Office Action", GB Application No. 1620891.0, Dec. 6, 2018, 5 pages.
"Foreign Office Action", CN Application No. 201580036075.8, Feb. 19, 2019, 5 pages.
"Foreign Office Action", JP Application No. 2016-563979, Feb. 7, 2018, 5 pages.
"Foreign Office Action", KR Application No. 1020187004283, Sep. 11, 2020, 5 pages.
"Foreign Office Action", GB Application No. 1912334.8, Sep. 23, 2019, 5 pages.
"Foreign Office Action", KR Application No. 10-2019-7004803, Jan. 21, 2021, 6 pages.
"Foreign Office Action", JP Application No. 2021-85256, Apr. 20, 2022, 6 pages.
"Foreign Office Action", EP Application No. 16724775.8, May 27, 2021, 6 pages.
"Foreign Office Action", KR Application No. 10-2019-7019768, Sep. 30, 2019, 6 pages.

(56) References Cited

OTHER PUBLICATIONS

"Foreign Office Action", JP Application No. 2016-567813, Jan. 16, 2018, 6 pages.
"Foreign Office Action", CN Application No. 201580034536.8, Oct. 9, 2018, 6 pages.
"Foreign Office Action", KR Application No. 10-2017-7027871, Nov. 23, 2018, 6 pages.
"Foreign Office Action", KR Application No. 10-2021-7037016, Dec. 23, 2021, 6 pages.
"Foreign Office Action", CN Application No. 201510300495.4, Apr. 10, 2019, 6 pages.
"Foreign Office Action", KR Application No. 10-2019-7004803, Apr. 26, 2019, 6 pages.
"Foreign Office Action", KR Application No. 1020187012629, May 24, 2018, 6 pages.
"Foreign Office Action", EP Application No. 15170577.9, May 30, 2017, 7 pages.
"Foreign Office Action", KR Application No. 1020197023675, Jul. 13, 2020, 7 pages.
"Foreign Office Action", KR Application No. 2019-7020454, Aug. 26, 2020, 7 pages.
"Foreign Office Action", EP Application No. 16716351.8, Mar. 15, 2019, 7 pages.
"Foreign Office Action", CN Application No. 201680021213.X, Aug. 27, 2020, 7 pages.
"Foreign Office Action", IN Application No. 201747044162, Sep. 3, 2020, 7 pages.
"Foreign Office Action", JP Application No. 2016-567813, Sep. 22, 2017, 8 pages.
"Foreign Office Action", KR Application No. 1020187004283, Jan. 3, 2020, 8 pages.
"Foreign Office Action", JP Application No. 2018021296, Dec. 25, 2018, 8 pages.
"Foreign Office Action", EP Application No. 15754323.2, Mar. 9, 2018, 8 pages.
"Foreign Office Action", EP Application No. 16724775.8, Nov. 23, 2018, 9 pages.
"Foreign Office Action", EP Application No. 20174555.1, Dec. 7, 2022, 9 pages.
"Foreign Office Action", DE Application No. 102016014611.7, Sep. 28, 2020, 9 pages.
"Foreign Office Action", KR Application No. 10-2016-7032967English Translation, Sep. 14, 2017, 4 pages.
"Foreign Office Acton", EP Application No. 21156948.8, May 21, 2021, 15 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Preliminary Report on Patentability", Application No. PCT/US2017/051663, Jun. 20, 2019, 10 pages.
"International Preliminary Report on Patentability", Application No. PCT/US2016/063874, Nov. 29, 2018, 12 pages.
"International Preliminary Report on Patentability", Application No. PCT/US2015/030388, Dec. 15, 2016, 12 pages.
"International Preliminary Report on Patentability", Application No. PCT/US2015/043963, Feb. 16, 2017, 12 pages.
"International Preliminary Report on Patentability", Application No. PCT/US2015/050903, Apr. 13, 2017, 12 pages.
"International Preliminary Report on Patentability", Application No. PCT/US2015/043949, Feb. 16, 2017, 13 pages.
"International Preliminary Report on Patentability", Application No. PCT/US2017/032733, Nov. 29, 2018, 7 pages.
"International Preliminary Report on Patentability", Application No. PCT/US2016/026756, Oct. 19, 2017, 8 pages.
"International Preliminary Report on Patentability", Application No. PCT/US2015/044774, Mar. 2, 2017, 8 pages.
"International Search Report and Written Opinion", Application No. PCT/US2016/060399, Jan. 30, 2017, 11 pages.
"International Search Report and Written Opinion", Application No. PCT/US2016/065295, Mar. 14, 2017, 12 pages.
"International Search Report and Written Opinion", Application No. PCT/US2015/044774, Nov. 3, 2015, 12 pages.
"International Search Report and Written Opinion", Application No. PCT/US2016/042013, Oct. 26, 2016, 12 pages.
"International Search Report and Written Opinion", Application No. PCT/US2016/062082, Feb. 23, 2017, 12 pages.
"International Search Report and Written Opinion", Application No. PCT/US2017/047691, Nov. 16, 2017, 13 pages.
"International Search Report and Written Opinion", Application No. PCT/US2016/024267, Jun. 20, 2016, 13 pages.
"International Search Report and Written Opinion", Application No. PCT/US2016/024273, Jun. 20, 2016, 13 pages.
"International Search Report and Written Opinion", Application No. PCT/US2016/032307, Aug. 25, 2016, 13 pages.
"International Search Report and Written Opinion", Application No. PCT/US2016/034366, Nov. 17, 2016, 13 pages.
"International Search Report and Written Opinion", Application No. PCT/US2016/029820, Jul. 15, 2016, 14 pages.
"International Search Report and Written Opinion", Application No. PCT/US2016/055671, Dec. 1, 2016, 14 pages.
"International Search Report and Written Opinion", Application No. PCT/US2016/030177, Aug. 2, 2016, 15 pages.
"International Search Report and Written Opinion", Application No. PCT/US2017/051663, Nov. 29, 2017, 16 pages.
"International Search Report and Written Opinion", Application No. PCT/US2015/043963, Nov. 24, 2015, 16 pages.
"International Search Report and Written Opinion", Application No. PCT/US2016/024289, Aug. 25, 2016, 17 pages.
"International Search Report and Written Opinion", Application No. PCT/US2015/043949, Dec. 1, 2015, 18 pages.
"International Search Report and Written Opinion", Application No. PCT/US2015/050903, Feb. 19, 2016, 18 pages.
"International Search Report and Written Opinion", Application No. PCT/US2016/030115, Aug. 8, 2016, 18 pages.
"International Search Report and Written Opinion", Application No. PCT/US2016/063874, May 11, 2017, 19 pages.
"International Search Report and Written Opinion", Application No. PCT/US2016/033342, Oct. 27, 2016, 20 pages.
"Life:X Lifestyle explorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 15/596,702, Jan. 4, 2019, 10 pages.
"Non-Final Office Action", U.S. Appl. No. 17/023,122, Sep. 16, 2022, 10 pages.
"Non-Final Office Action", U.S. Appl. No. 16/153,395, Oct. 22, 2019, 10 Pages.
"Non-Final Office Action", U.S. Appl. No. 15/286,837, Oct. 26, 2018, 10 pages.
"Non-Final Office Action", U.S. Appl. No. 14/504,139, Jan. 27, 2017, 10 pages.
"Non-Final Office Action", U.S. Appl. No. 14/959,799, Jan. 27, 2017, 10 pages.
"Non-Final Office Action", U.S. Appl. No. 15/398,147, Mar. 9, 2017, 10 pages.
"Non-Final Office Action", U.S. Appl. No. 16/843,813, Mar. 18, 2021, 12 pages.
"Non-Final Office Action", U.S. Appl. No. 14/504,139, Oct. 18, 2017, 12 pages.
"Non-Final Office Action", U.S. Appl. No. 15/287,155, Dec. 10, 2018, 12 pages.
"Non-Final Office Action", U.S. Appl. No. 14/666,155, Feb. 3, 2017, 12 pages.
"Non-Final Office Action", U.S. Appl. No. 15/424,263, May 23, 2019, 12 pages.
"Non-Final Office Action", U.S. Appl. No. 16/669,842, Sep. 3, 2020, 12 pages.
"Non-Final Office Action", U.S. Appl. No. 16/252,477, Jan. 10, 2020, 13 Pages.

(56) References Cited

OTHER PUBLICATIONS

"Non-Final Office Action", U.S. Appl. No. 14/504,121, Jan. 9, 2017, 13 pages.
"Non-Final Office Action", U.S. Appl. No. 14/809,901, May 24, 2018, 13 pages.
"Non-Final Office Action", U.S. Appl. No. 14/959,730, Jun. 23, 2017, 14 pages.
"Non-Final Office Action", U.S. Appl. No. 15/462,957, May 24, 2019, 14 pages.
"Non-Final Office Action", U.S. Appl. No. 14/862,409, Jun. 22, 2017, 15 pages.
"Non-Final Office Action", U.S. Appl. No. 14/930,220, Sep. 14, 2016, 15 pages.
"Non-Final Office Action", U.S. Appl. No. 16/238,464, Mar. 7, 2019, 15 pages.
"Non-Final Office Action", U.S. Appl. No. 15/286,512, Jul. 19, 2018, 15 pages.
"Non-Final Office Action", U.S. Appl. No. 15/142,829, Aug. 16, 2018, 15 pages.
"Non-Final Office Action", U.S. Appl. No. 14/720,632, Jun. 14, 2017, 16 pages.
"Non-Final Office Action", U.S. Appl. No. 15/142,619, Aug. 25, 2017, 16 pages.
"Non-Final Office Action", U.S. Appl. No. 14/959,799, Sep. 8, 2017, 16 pages.
"Non-Final Office Action", U.S. Appl. No. 14/715,454, Jan. 11, 2018, 16 pages.
"Non-Final Office Action", U.S. Appl. No. 15/595,649, Oct. 31, 2017, 16 pages.
"Non-Final Office Action", U.S. Appl. No. 14/504,139, Oct. 5, 2018, 16 pages.
"Non-Final Office Action", U.S. Appl. No. 15/976,518, filed Nov. 25, 2020, 16 pages.
"Non-Final Office Action", U.S. Appl. No. 14/518,863, Oct. 14, 2016, 16 pages.
"Non-Final Office Action", U.S. Appl. No. 14/599,954, 2017-01-26, 16 pages.
"Non-Final Office Action", U.S. Appl. No. 16/822,601, Mar. 15, 2021, 17 pages.
"Non-Final Office Action", U.S. Appl. No. 16/503,234, Mar. 18, 2021, 17 pages.
"Non-Final Office Action", U.S. Appl. No. 14/862,409, Dec. 14, 2017, 17 pages.
"Non-Final Office Action", U.S. Appl. No. 14/599,954, Feb. 2, 2016, 17 pages.
"Non-Final Office Action", U.S. Appl. No. 15/287,253, Apr. 5, 2018, 17 pages.
"Non-Final Office Action", U.S. Appl. No. 16/503,234, Aug. 5, 2020, 18 Pages.
"Non-Final Office Action", U.S. Appl. No. 15/093,533, Aug. 24, 2017, 18 pages.
"Non-Final Office Action", U.S. Appl. No. 15/142,689, Oct. 4, 2017, 18 pages.
"Non-Final Office Action", U.S. Appl. No. 15/287,308, Oct. 15, 2018, 18 pages.
"Non-Final Office Action", U.S. Appl. No. 15/286,537, Nov. 19, 2018, 18 pages.
"Non-Final Office Action", U.S. Appl. No. 15/287,359, Jun. 26, 2020, 19 Pages.
"Non-Final Office Action", U.S. Appl. No. 14/504,121, Jan. 2, 2018, 19 pages.
"Non-Final Office Action", U.S. Appl. No. 15/287,359, Oct. 28, 2020, 19 pages.
"Non-Final Office Action", U.S. Appl. No. 15/287,253, Sep. 7, 2018, 20 pages.
"Non-Final Office Action", U.S. Appl. No. 14/518,863, Sep. 29, 2017, 20 pages.
"Non-Final Office Action", U.S. Appl. No. 14/720,632, May 18, 2018, 20 pages.
"Non-Final Office Action", U.S. Appl. No. 14/959,901, Jan. 8, 2018, 21 pages.
"Non-Final Office Action", U.S. Appl. No. 15/596,702, Oct. 21, 2019, 21 Pages.
"Non-Final Office Action", U.S. Appl. No. 17/394,241, Dec. 18, 2023, 21 pages.
"Non-Final Office Action", U.S. Appl. No. 15/704,825, Jun. 1, 2020, 22 Pages.
"Non-Final Office Action", U.S. Appl. No. 15/791,044, Sep. 30, 2019, 22 Pages.
"Non-Final Office Action", U.S. Appl. No. 14/959,901, Oct. 11, 2018, 22 pages.
"Non-Final Office Action", U.S. Appl. No. 16/689,519, filed Oct. 20, 2020, 22 pages.
"Non-Final Office Action", U.S. Appl. No. 14/504,038, Feb. 26, 2016, 22 pages.
"Non-Final Office Action", U.S. Appl. No. 17/005,207, Apr. 1, 2021, 23 pages.
"Non-Final Office Action", U.S. Appl. No. 17/023,122, Jan. 24, 2022, 25 pages.
"Non-Final Office Action", U.S. Appl. No. 14/312,486, Oct. 23, 2015, 25 pages.
"Non-Final Office Action", U.S. Appl. No. 15/596,702, Aug. 19, 2020, 27 Pages.
"Non-Final Office Action", U.S. Appl. No. 15/286,152, Oct. 19, 2018, 27 pages.
"Non-Final Office Action", U.S. Appl. No. 15/286,537, Sep. 3, 2019, 28 Pages.
"Non-Final Office Action", U.S. Appl. No. 15/704,615,Jun. 1, 2020, 29 Pages.
"Non-Final Office Action", U.S. Appl. No. 15/267,181, Feb. 8, 2018, 29 pages.
"Non-Final Office Action", U.S. Appl. No. 15/403,066, May 4, 2017, 31 pages.
"Non-Final Office Action", U.S. Appl. No. 17/500,747, Nov. 10, 2022, 32 pages.
"Non-Final Office Action", U.S. Appl. No. 14/699,181, Oct. 18, 2017, 33 pages.
"Non-Final Office Action", U.S. Appl. No. 17/523,051, Nov. 10, 2022, 33 pages.
"Non-Final Office Action", U.S. Appl. No. 14/504,038, Mar. 22, 2017, 33 pages.
"Non-Final Office Action", U.S. Appl. No. 16/875,427, Oct. 5, 2021, 37 pages.
"Non-Final Office Action", U.S. Appl. No. 15/287,394, Mar. 22, 2019, 39 pages.
"Non-Final Office Action", U.S. Appl. No. 17/488,015, Nov. 10, 2022, 47 pages.
"Non-Final Office Action", U.S. Appl. No. 15/166,198, Feb. 21, 2019, 48 pages.
"Non-Final Office Action", U.S. Appl. No. 17/517,978, Apr. 24, 2023, 6 pages.
"Non-Final Office Action", U.S. Appl. No. 17/119,312, Sep. 2, 2022, 6 pages.
"Non-Final Office Action", U.S. Appl. No. 17/506,605, Jul. 27, 2022, 7 pages.
"Non-Final Office Action", U.S. Appl. No. 15/398,147, Sep. 8, 2017, 7 pages.
"Non-Final Office Action", U.S. Appl. No. 14/874,955, Feb. 8, 2018, 7 pages.
"Non-Final Office Action", U.S. Appl. No. 14/681,625, Mar. 6, 2017, 7 pages.
"Non-Final Office Action", U.S. Appl. No. 18/312,509, Mar. 21, 2024, 7 pages.
"Non-Final Office Action", U.S. Appl. No. 18/312,509, Apr. 8, 2024, 7 pages.
"Non-Final Office Action", U.S. Appl. No. 18/495,648, May 31, 2024, 7 pages.
"Non-Final Office Action", U.S. Appl. No. 15/586,174, Jun. 18, 2018, 7 pages.
"Non-Final Office Action", U.S. Appl. No. 14/504,061, Nov. 4, 2015, 8 pages.

(56) References Cited

OTHER PUBLICATIONS

"Non-Final Office Action", U.S. Appl. No. 14/874,955, Feb. 27, 2017, 8 pages.
"Non-Final Office Action", U.S. Appl. No. 14/513,875, Feb. 21, 2017, 9 pages.
"Non-Final Office Action", U.S. Appl. No. 16/744,626, filed Sep. 23, 2020, 9 Pages.
"Non-Final Office Action", U.S. Appl. No. 14/582,896, Jun. 29, 2016, 9 pages.
"Non-Final Office Action", U.S. Appl. No. 14/681,625, Aug. 12, 2016, 9 pages.
"Non-Final Office Action", U.S. Appl. No. 14/666,155, Aug. 24, 2016, 9 pages.
"Non-Invasive Quantification of Peripheral Arterial Volume Distensibility and its Non-Lineaer Relationship with Arterial Pressure", Journal of Biomechanics, Pergamon Press, vol. 42, No. 8; as cited in the search report for PCT/US2016/013968 citing the whole document, but in particular the abstract, May 29, 2009, 2 pages.
"Notice of Allowability", U.S. Appl. No. 16/560,085, Nov. 12, 2020, 2 pages.
"Notice of Allowance", U.S. Appl. No. 16/744,626, Jan. 1, 2021, 10 pages.
"Notice of Allowance", U.S. Appl. No. 16/238,464, Nov. 4, 2019, 10 Pages.
"Notice of Allowance", U.S. Appl. No. 15/424,263, Nov. 14, 2019, 10 Pages.
"Notice of Allowance", U.S. Appl. No. 15/287,394, Mar. 4, 2020, 11 Pages.
"Notice of Allowance", U.S. Appl. No. 14/599,954, May 24, 2017, 11 pages.
"Notice of Allowance", U.S. Appl. No. 16/153,395, Feb. 20, 2020, 13 Pages.
"Notice of Allowance", U.S. Appl. No. 16/875,427, Feb. 22, 2022, 13 pages.
"Notice of Allowance", U.S. Appl. No. 15/917,238, Aug. 21, 2019, 13 pages.
"Notice of Allowance", U.S. Appl. No. 15/287,253, Aug. 26, 2019, 13 Pages.
"Notice of Allowance", U.S. Appl. No. 15/286,512, Apr. 9, 2019, 14 pages.
"Notice of Allowance", U.S. Appl. No. 14/312,486, Oct. 7, 2016, 15 pages.
"Notice of Allowance", U.S. Appl. No. 16/401,611, Jun. 10, 2020, 17 Pages.
"Notice of Allowance", U.S. Appl. No. 15/287,308, Jul. 17, 2019, 17 Pages.
"Notice of Allowance", U.S. Appl. No. 14/504,038, Aug. 7, 2017, 17 pages.
"Notice of Allowance", U.S. Appl. No. 15/403,066, Jan. 8, 2018, 18 pages.
"Notice of Allowance", U.S. Appl. No. 15/287,200, Nov. 6, 2018, 19 pages.
"Notice of Allowance", U.S. Appl. No. 15/286,152, Mar. 5, 2019, 23 pages.
"Notice of Allowance", U.S. Appl. No. 17/119,312, Jan. 13, 2023, 5 pages.
"Notice of Allowance", U.S. Appl. No. 16/356,748, Feb. 11, 2020, 5 Pages.
"Notice of Allowance", U.S. Appl. No. 17/523,051, Feb. 28, 2023, 5 pages.
"Notice of Allowance", U.S. Appl. No. 17/488,015, filed Mar. 1, 2023, 5 pages.
"Notice of Allowance", U.S. Appl. No. 17/500,747, filed Mar. 1, 2023, 5 pages.
"Notice of Allowance", U.S. Appl. No. 14/715,793, Jul. 6, 18, 5 pages.
"Notice of Allowance", U.S. Appl. No. 17/005,207, Jul. 14, 2021, 5 pages.
"Notice of Allowance", U.S. Appl. No. 15/093,533, Jul. 16, 2020, 5 Pages.
"Notice of Allowance", U.S. Appl. No. 15/286,495, Jan. 17, 2019, 5 pages.
"Notice of Allowance", U.S. Appl. No. 15/595,649, Jan. 3, 2019, 5 pages.
"Notice of Allowance", U.S. Appl. No. 17/506,605, Oct. 19, 2022, 5 pages.
"Notice of Allowance", U.S. Appl. No. 14/715,793, Dec. 18, 2017, 5 pages.
"Notice of Allowance", U.S. Appl. No. 14/666,155, Feb. 20, 2018, 5 pages.
"Notice of Allowance", U.S. Appl. No. 14/582,896, Nov. 7, 2016, 5 pages.
"Notice of Allowance", U.S. Appl. No. 15/703,511, Apr. 16, 2019, 5 pages.
"Notice of Allowance", U.S. Appl. No. 15/586,174, Sep. 24, 2018, 5 pages.
"Notice of Allowance", U.S. Appl. No. 15/287,359, Apr. 14, 2021, 7 pages.
"Notice of Allowance", U.S. Appl. No. 14/513,875, Jun. 28, 2017, 7 pages.
"Notice of Allowance", U.S. Appl. No. 14/666,155, Jul. 10, 2017, 7 pages.
"Notice of Allowance", U.S. Appl. No. 15/142,471, Aug. 6, 2020, 7 Pages.
"Notice of Allowance", U.S. Appl. No. 16/389,402, Aug. 21, 2019, 7 Pages.
"Notice of Allowance", U.S. Appl. No. 16/380,245, Sep. 15, 2020, 7 Pages.
"Notice of Allowance", U.S. Appl. No. 15/976,518, Sep. 28, 2021, 7 pages.
"Notice of Allowance", U.S. Appl. No. 14/874,955, Oct. 20, 2017, 7 pages.
"Notice of Allowance", U.S. Appl. No. 14/504,061, Sep. 12, 2016, 7 pages.
"Notice of Allowance", U.S. Appl. No. 14/494,863, May 30, 2017, 7 pages.
"Notice of Allowance", U.S. Appl. No. 14/681,625, Jun. 7, 2017, 7 pages.
"Notice of Allowance", U.S. Appl. No. 15/286,837, Mar. 6, 2019, 7 pages.
"Notice of Allowance", U.S. Appl. No. 14/731,195, Apr. 24, 2019, 7 pages.
"Notice of Allowance", U.S. Appl. No. 14/862,409, Jun. 6, 2018, 7 pages.
"Notice of Allowance", U.S. Appl. No. 15/287,155, Jul. 25, 2019, 7 pages.
"Notice of Allowance", U.S. Appl. No. 15/462,957, Jan. 23, 2020, 8 Pages.
"Notice of Allowance", U.S. Appl. No. 15/791,044, Feb. 12, 2020, 8 Pages.
"Notice of Allowance", U.S. Appl. No. 14/504,121, Jun. 1, 2021, 8 pages.
"Notice of Allowance", U.S. Appl. No. 16/503,234, Jun. 11, 2021, 8 pages.
"Notice of Allowance", U.S. Appl. No. 16/252,477, Jun. 24, 2020, 8 Pages.
"Notice of Allowance", U.S. Appl. No. 16/843,813, Jun. 30, 2021, 8 pages.
"Notice of Allowance", U.S. Appl. No. 17/517,978, Jun. 30, 2023, 8 pages.
"Notice of Allowance", U.S. Appl. No. 15/362,359, Aug. 3, 18, 8 pages.
"Notice of Allowance", U.S. Appl. No. 17/148,374, Oct. 14, 2021, 8 pages.
"Notice of Allowance", U.S. Appl. No. 16/560,085, Oct. 19, 2020, 8 pages.
"Notice of Allowance", U.S. Appl. No. 14/681,625, Oct. 23, 2017, 8 pages.
"Notice of Allowance", U.S. Appl. No. 14/874,955, Oct. 4, 2018, 8 pages.
"Notice of Allowance", Application No. 15/398, 147, Nov. 15, 17, 8 pages.

(56) References Cited

OTHER PUBLICATIONS

"Notice of Allowance", U.S. Appl. No. 16/669,842, Dec. 18, 2020, 8 pages.
"Notice of Allowance", U.S. Appl. No. 14/959,730, Feb. 22, 2018, 8 pages.
"Notice of Allowance", U.S. Appl. No. 15/142,829, Feb. 6, 2019, 8 pages.
"Notice of Allowance", U.S. Appl. No. 14/930,220, Feb. 2, 2017, 8 pages.
"Notice of Allowance", U.S. Appl. No. 18/312,509, Jun. 13, 2024, 8 pages.
"Notice of Allowance", U.S. Appl. No. 17/394,241, Jun. 24, 2024, 8 pages.
"Notice of Allowance", U.S. Appl. No. 15/352,194, Jun. 26, 2019, 8 pages.
"Notice of Allowance", U.S. Appl. No. 15/595,649, Sep. 14, 2018, 8 pages.
"Notice of Allowance", U.S. Appl. No. 17/023,122, Mar. 6, 2023, 9 pages.
"Notice of Allowance", U.S. Appl. No. 17/361,824, Jun. 9, 2022, 9 pages.
"Notice of Allowance", U.S. Appl. No. 16/563,124, Jul. 8, 2021, 9 pages.
"Notice of Allowance", U.S. Appl. No. 15/343,067, Jul. 27, 2017, 9 pages.
"Notice of Allowance", U.S. Appl. No. 16/822,601, ug. 5, 2021, 9 pages.
"Notice of Allowance", U.S. Appl. No. 16/689,519, Sep. 30, 2021, 9 pages.
"Notice of Allowance", U.S. Appl. No. 16/356,748, Oct. 17, 2019, 9 Pages.
"Notice of Allowance", U.S. Appl. No. 15/142,689, Oct. 30, 2018, 9 pages.
"Notice of Allowance", U.S. Appl. No. 14/504,137, Feb. 6, 2019, 9 pages.
"Notice of Allowance", U.S. Appl. No. 14/599,954, Mar. 15, 2018, 9 pages.
"Notice of Allowance", U.S. Appl. No. 15/142,619, Aug. 13, 2018, 9 pages.
"Patent Board Decision", U.S. Appl. No. 14/504,121, 05/20/20201, 9 pages.
"Philips Vital Signs Camera", Retrieved From: <http://www.vitalsignscamera.com/> Apr. 15, 2015, Jul. 17, 2013, 2 pages.
"Pre-Interview Communication", U.S. Appl. No. 15/287,359, Jul. 24, 2018, 2 pages.
"Pre-Interview Communication", U.S. Appl. No. 16/380,245,Jun. 15, 2020, 3 Pages.
"Pre-Interview Communication", U.S. Appl. No. 16/080,293, Jun. 25, 2020, 3 Pages.
"Pre-Interview Communication", U.S. Appl. No. 14/513,875, Oct. 21, 2016, 3 pages.
"Pre-Interview Communication", U.S. Appl. No. 15/142,471, Dec. 12, 2018, 3 pages.
"Pre-Interview Communication", U.S. Appl. No. 14/715,793, Mar. 20, 2017, 3 pages.
"Pre-Interview Communication", U.S. Appl. No. 14/715,454, Apr. 14, 2017, 3 pages.
"Pre-Interview Communication", U.S. Appl. No. 15/343,067, Apr. 19, 2017, 3 pages.
"Pre-Interview Communication", U.S. Appl. No. 16/401,611, Apr. 13, 2020, 4 Pages.
"Pre-Interview Communication", U.S. Appl. No. 15/286,495, Sep. 10, 2018, 4 pages.
"Pre-Interview Communication", U.S. Appl. No. 14/959,901, Feb. 10, 2017, 4 pages.
"Pre-Interview Communication", U.S. Appl. No. 14/959,730, Feb. 15, 2017, 4 pages.
"Pre-Interview Communication", U.S. Appl. No. 15/362,359, May 17, 2018, 4 pages.
"Pre-Interview Communication", U.S. Appl. No. 15/703,511, Feb. 11, 2019, 5 pages.
"Pre-Interview Communication", U.S. Appl. No. 14/494,863, Jan. 27, 2017, 5 pages.
"Pre-Interview Communication", U.S. Appl. No. 15/917,238, May 1, 2019, 6 pages.
"Pre-Interview Communication", U.S. Appl. No. 15/166,198, Mar. 8, 2018, 8 pages.
"Pre-Interview First Office Action", U.S. Appl. No. 15/286,152, Feb. 8, 2018, 4 pages.
"Pre-Interview Office Action", U.S. Appl. No. 14/862,409, Sep. 15, 2017, 16 pages.
"Pre-Interview Office Action", U.S. Appl. No. 14/731,195, Dec. 20, 2017, 4 pages.
"Preliminary Report on Patentability", Application No. PCT/US2016/034366, Dec. 7, 2017, 10 pages.
"Preliminary Report on Patentability", Application No. PCT/US2016/030177, Oct. 31, 2017, 11 pages.
"Preliminary Report on Patentability", Application No. PCT/US2016/030115, Oct. 31, 2017, 15 pages.
"Preliminary Report on Patentability", Application No. PCT/US2016/030185, Nov. 9, 2017, 16 pages.
"Preliminary Report on Patentability", Application No. PCT/US2016/065295, Jul. 24, 2018, 18 pages.
"Preliminary Report on Patentability", Application No. PCT/US2016/042013, Jan. 30, 2018, 7 pages.
"Preliminary Report on Patentability", Application No. PCT/US2016/062082, Nov. 15, 2018, 8 pages.
"Preliminary Report on Patentability", Application No. PCT/US2016/055671, Apr. 10, 2018, 9 pages.
"Preliminary Report on Patentability", Application No. PCT/US2016/032307, Dec. 7, 2017, 9 pages.
"Pressure-vol. Loop Analysis in Cardiology", retrieved from https://en.wikipedia.org/w/index.php?t itle=Pressure-volume loop analysis in card iology&oldid=636928657 on Sep. 23, 17; Obtained per link provided in search report from PCT/US2016/01398 on Jul. 28, 2016, Dec. 6, 2014, 10 pages.
"Restriction Requirement", U.S. Appl. No. 15/976,518, Jul. 9, 2020, 5 Pages.
"Restriction Requirement", U.S. Appl. No. 15/362,359, Jan. 8, 2018, 5 pages.
"Restriction Requirement", U.S. Appl. No. 14/666,155, Jul. 22, 2016, 5 pages.
"Restriction Requirement", U.S. Appl. No. 15/462,957, Jan. 4, 2019, 6 pages.
"Restriction Requirement", U.S. Appl. No. 16/563,124, Apr. 5, 2021, 7 pages.
"Restriction Requirement", U.S. Appl. No. 15/352,194, Feb. 6, 2019, 8 pages.
"Restriction Requirement", U.S. Appl. No. 15/286,537, Aug. 27, 2018, 8 pages.
"Samsung Galaxy S4 Air Gestures", Video retrieved from https://www.youtube.com/watch?v=375Hb87yGcg, May 7, 13, 4 pages.
"Search Report", GB Application No. 2007255.9, Jul. 6, 2020, 1 page.
"Summons to Attend Oral Proceedings", EP Application No. 16724775.8, Mar. 17, 2022, 10 pages.
"Textile Wire Brochure", Retrieved at: http://www.textile-wire.ch/en/home.html, Aug. 7, 2004, 17 pages.
"The Dash smart earbuds play back music, and monitor your workout", Retrieved from <http://newatlas.com/bragi-dash-tracking-earbuds/30808/>, Feb. 13, 2014, 3 pages.
"The Instant Blood Pressure app estimates blood pressure with your smartphone and our algorithm", Retrieved at: http://www.instantbloodpressure.com/—on Jun. 23, 2016, 6 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 2018, 4 pages.
"Written Opinion", Application No. PCT/US2016/030185, Nov. 3, 2016, 15 pages.
"Written Opinion", Application No. PCT/US2017/032733, Jul. 24, 2017, 5 pages.

(56) References Cited

OTHER PUBLICATIONS

"Written Opinion", Application No. PCT/US2017/032733, Jul. 26, 2017, 5 pages.
"Written Opinion", Application No. PCT/US2016/042013, Feb. 2, 2017, 6 pages.
"Written Opinion", Application No. PCT/US2016/060399, May 11, 2017, 6 pages.
"Written Opinion", Application No. PCT/US2016/026756, Nov. 10, 2016, 7 pages.
"Written Opinion", Application No. PCT/US2016/055671, Apr. 13, 2017, 8 pages.
"Written Opinion", Application No. PCT/US2016/065295, Apr. 13, 2018, 8 pages.
"Written Opinion", Application No. PCT/US2017/051663, Oct. 12, 2018, 8 pages.
"Written Opinion", Application No. PCT/US2016/013968, Jul. 28, 2016, 9 pages.
"Written Opinion", Application No. PCT/US2016/030177, Nov. 3, 2016, 9 pages.
Amihood, Patrick M., et al., "Closed-Loop Manufacturing System Using Radar", Technical Disclosure Commons; Retrieved from http://www.tdcommons.org/dpubs_series/464, Apr. 17, 2017, 8 pages.
Antonimithu , "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.
Arbabian, Amin , et al., "A 94GHz mm-Wave to Baseband Pulsed-Radar for Imaging and Gesture Recognition", , Apr. 4, 2013, pp. 1055-1071.
Azevedo, Stephen , et al., "Micropower Impulse Radar", Science & Technology Review, 7 pages.
Badawy, Wael , "System on Chip", Section 1.1 "Real-Time Applications" Springer Science & Business Media,, 14 pages.
Balakrishnan, Guha , et al., "Detecting Pulse from Head Motions in Video", In Proceedings: CVPR '13 Proceedings of the Conference on Computer Vision and Pattern Recognition, 8 pages.
Bondade, Rajdeep , et al., "A linear-assisted DC-DC hybrid power converter for envelope tracking RF power amplifiers", , Sep. 14, 2014, 5 pages.
Cheng, Jingyuan , "Smart Textiles: From Niche to Mainstream", IEEE Pervasive Computing, pp. 81-84.
Couderc, Jean-Philippe , et al., "Detection of Atrial Fibrillation using Contactless Facial Video Monitoring", , Jan. 2015, 7 pages.
Dias, T , et al., "Capacitive Fibre-Meshed Transducer for Touch & Proximity Sensing Applications", , Oct. 1, 2005, 5 pages.
Duncan, David P, "Motion Compensation of Synthetic Aperture Radar", Microwave Earth Remote Sensing Laboratory, Brigham Young University, Apr. 15, 2003, 5 pages.
Espina, Javier , et al., "Wireless Body Sensor Network for Continuous Cuff-less Blood Pressure Monitoring", , Sep. 2006, 5 pages.
Fan, Tenglong , et al., "Wireless Hand Gesture Recognition Based on Continuous-Wave Doppler Radar Sensors", , Nov. 1, 2016, 9 pages.
Farringdon, Jonny , et al., "Wearable Sensor Badge & Sensor Jacket for Context Awareness", Third International Symposium on Wearable Computers, 7 pages.
Felch, Andrew , et al., "Standard Radar API: Proposal Version 0.1", Technical Disclosure Commons, 18 pages.
Fogle, O Ryan, et al., "Micro-Range/Micro-Doppler Decomposition of Human Radar Signatures", , Oct. 2012, 15 pages.
Garmatyuk, Dmitriy S, et al., "Ultra-Wideband Continuous-Wave Random Noise Arc- Sar", IEEE Transaction on Geoscience and Remote Sensing, vol. 40, No. 12, Dec. 2002, 10 pages.
Geisheimer, Jonathan L, et al., "A Continuous-Wave (CW) Radar for Gait Analysis", , Dec. 2001, 5 pages.
Godana, Bruhtesfa E, "Human Movement Characterization in Indoor Environment using GNU Radio Based Radar", , 2009-11-30, 100 pages.
Guerra, Anna , et al., "Millimeter-Wave Personal Radars for 3D Environment Mapping", 48TH Asilomar Conference On Signals, Systems and Computer, pp. 701-705.
Gürbüz, Sevgi Z., et al., "Detection and Identification of Human Targets in Radar Data", Proc. SPIE 6567, Signal Processing, Sensor Fusion, and Target Recognition XVI, 656701, May 7, 2007, 12 pages.
He, David Da, "A Continuous, Wearable, and Wireless Heart Monitor Using Head Ballistocardiogram (BCG) and Head Electrocardiogram (ECG) with a Nanowatt ECG Heartbeat Detection Circuit", , Feb. 2013, 137 pages.
Holleis, Paul , et al., "Evaluating Capacitive Touch Input on Clothes", Proceedings of the 10th International Conference on Human Computer Interaction, 10 pages.
Holleis, Paul , et al., "Evaluating Capacitive Touch Input on Clothes", , Jan. 1, 2008, 11 pages.
Hollington, Jessie , "Playing back all songs on iPod", retrieved at: https://www.ilounge.com/index.php/articles/comments/playing-back-all-songs-on-ipod, 2 pages.
Ishijima, Masa , "Unobtrusive Approaches to Monitoring Vital Signs at Home", , Sep. 26, 2007, 3 pages.
Karagozler, Mustafa Emre, et al., "Embedding Radars in Robots to Accurately Measure Motion", Technical Disclosure Commons; Retrieved from http://www.tdcommons.org/dpubs_series/454, Mar. 30, 2017, 8 pages.
Klabunde, Richard E, "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Kubota, Yusuke , et al., "A Gesture Recognition Approach by using Microwave Doppler Sensors", , Apr. 15, 2010, 12 pages.
Lee, Cullen E, "Computing the Apparent Centroid of Radar Targets", , May 1996, 21 pages.
Lien, Jaime , et al., "Embedding Radars in Robots for Safety and Obstacle Detection", Technical Disclosure Commons; Retrieved from http://www.tdcommons.org/dpubs_series/455, 10 pages.
Lien, Jaime , et al., "Soli: Ubiquitous Gesture Sensing with Millimeter Wave Radar", , Jul. 11, 2016, 19 pages.
Martinez-Garcia, Hermino , et al., "Four-quadrant linear-assisted DC/DC voltage regulator", , Apr. 23, 2016, 10 pages.
Matthews, Robert J, "Venous Pulse", Retrieved at: http://www.rjmatthewsmd.com/Definitions/venous_pulse.htm—on Nov. 30, 2016, Apr. 13, 2013, 7 pages.
Nakajima, Kazuki , et al., "Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, 8 pages.
Narasimhan, Shar , "Combining Self- & Mutual-Capacitive Sensing for Distinct User Advantages", Retrieved from the Internet: URL:http://www.designnews.com/author.asp? section_id=1365&doc_id=271356&print=yes [retrieved on Oct. 1, 2015], 5 pages.
Otto, Chris , et al., "System Architecture of a Wireless Body Area Sensor Network for Ubiquitous Health Monitoring", Journal of Mobile Multimedia; vol. 1, No. 4, 20 pages.
Palese , et al., "The Effects of Earphones and Music on the Temperature Measured by Infrared Tympanic Thermometer: Preliminary Results", ORL-head and neck nursing: official journal of the Society of Otorhinolaryngology and Head-Neck Nurses 32.2, Jan. 1, 2013, pp. 8-12.
Patel, P C, et al., "Applications of Electrically Conductive Yarns in Technical Textiles", International Conference on Power System Technology (POWECON), Oct. 30, 2012, 6 pages.
Poh, Ming-Zher , et al., "A Medical Mirror for Non-contact Health Monitoring", In Proceedings: ACM SIGGRAPH Emerging Technologies, 1 page.
Poh, Ming-Zher , et al., "Non-contact, Automated Cardiac Pulse Measurements Using Video Imaging and Blind Source Separation.", In Proceedings: Optics Express, vol. 18, No. 10, 13 pages.
Prasad, Shitala , et al., "A Wireless Dynamic Gesture User Interface for HCI Using Hand Data Glove", Downloaded on Mar. 16, 2024 at 21:48:55 UTC from IEEE Xplore., 6 pages.

(56) References Cited

OTHER PUBLICATIONS

Pu, Qifan , et al., "Gesture Recognition Using Wireless Signals", , Oct. 2014, pp. 15-18.
Pu, Qifan , et al., "Whole-Home Gesture Recognition Using Wireless Signals", , Sep. 2013, 12 pages.
Pu, Qifan , et al., "Whole-Home Gesture Recognition Using Wireless Signals", , Oct. 2013, 12 pages.
Pu, Qifan , et al., "Whole-Home Gesture Recognition Using Wireless Signals", , Sep. 30, 13, 12 pages.
Pu, Quifan , et al., "Whole-Home Gesture Recognition Using Wireless Signals", MobiCom '13 Proceedings of the 19th annual international conference on Mobile computing & networking, 12 pages.
Schneegass, Stefan , et al., "Towards a Garment OS: Supporting Application Development for Smart Garments", Wearable Computers, ACM, 6 pages.
Skolnik, Merrill I., "Cw and Frequency-Modulated Radar", In: "Introduction To Radar Systems", Jan. 1, 1981 (Jan. 1, 2981), McGraw Hill, XP055047545, ISBN: 978-0-07-057909- 5 pp. 68-100, p. 95-p. 97, Jan. 1, 1981, 18 pages.
Stoppa, Matteo , "Wearable Electronics and Smart Textiles: A Critical Review", In Proceedings of Sensors, vol. 14, Issue 7, p. 11957-11992.
Tan, Bo , et al., "A Real-Time High Resolution Passive WiFi Doppler-Radar and Its Applications", Downloaded on Mar. 16, 2024 at 18:09:52 UTC from IEEE Xplore., 6 pages.
Wang, Wenjin , et al., "Exploiting Spatial Redundancy of Image Sensor for Motion Robust rPPG", In Proceedings: IEEE Transactions on Biomedical Engineering, vol. 62, Issue 2, 11 pages.
Wang, Yazhou , et al., "Micro-Doppler Signatures for Intelligent Human Gait Recognition Using a UWB Impulse Radar", 2011 IEEE International Symposium on Antennas and Propagation (APSURSI), pp. 2103-2106.
Wijesiriwardana, R , et al., "Capacitive Fibre-Meshed Transducer for Touch & Proximity Sensing Applications", IEEE Sensors Journal, IEEE Service Center, 5 pages.
Zhadobov, Maxim , et al., "Millimeter-Wave Interactions with the Human Body: State of Knowledge and Recent Advances", , Jan. 2011, 11 pages.
Zhadobov, Maxim , et al., "Millimeter-wave Interactions with the Human Body: State of Knowledge and Recent Advances", International Journal of Microwave and Wireless Technologies, 11 pages.
Zhang, Ruquan , et al., "Study of the Structural Design and Capacitance Characteristics of Fabric Sensor", Advanced Materials Research (vols. 194-196), 8 pages.
Zheng, Chuan , et al., "Doppler Bio-Signal Detection Based Time-Domain Hand Gesture Recognition", , Dec. 9, 2013, 3 Pages.
"Final Office Action", U.S. Appl. No. 18/952,779, Mar. 2, 2026, 13 pages.
"Extended European Search Report", EP Application No. 25226924.6, May 6, 2026, 9 pages.
"Non-Final Office Action", U.S. Appl. No. 18/952,779, filed Aug. 11, 2026, 11 pages.

* cited by examiner

ADVANCED GAMING AND VIRTUAL REALITY CONTROL USING RADAR

RELATED APPLICATIONS

This application is a continuation application of U.S. patent application Ser. No. 18/312,509, filed on May 4, 2023, which is a continuation application of U.S. patent application Ser. No. 17/119,312, filed on Dec. 11, 2020, now U.S. Pat. No. 11,656,336, which is a continuation application of U.S. patent application Ser. No. 16/380,245, filed on Apr. 10, 2019, now U.S. Pat. No. 10,908,696, which is a continuation application of U.S. patent application Ser. No. 15/286,495, filed on Oct. 5, 2016, now U.S. Pat. No. 10,300,370, which in turn claims priority to U.S. Provisional Patent Application Ser. No. 62/237,975, filed on Oct. 6, 2015, the disclosures of which are incorporated by reference herein in their entireties.

BACKGROUND

Current gaming and virtual reality (VR) control often uses visual tracking or hand-held controllers. Visual tracking uses optical or infrared cameras to track major body motions to control a user's game or VR environment. These cameras, however, suffer from inadequate spatial resolution, sensitivity to light and darkness, or inability to handle optical occlusions due to clothes or other objects obscuring a user's hands or body.

Current hand-held controllers do not permit the great breadth of control that is often desired to control a game, as they are limited by the number and orientation of buttons or inadequate motion-sensing sensors, such as accelerometers. Further, hand-held controllers often are nearly worthless for VR, as in VR it is desirable to know a user's body and hand orientation within the VR world, which hand-held controllers do not provide.

A partial solution to this problem involves radio-frequency (RF) techniques that track a point on a moving object. These current RF techniques, however, struggle to determine small motions without having large, complex, or expensive radar systems due to the resolution of the radar tracking system being constrained by the hardware of the radar system.

SUMMARY

This document describes techniques for advanced gaming and virtual reality control using radar. These techniques enable small motions and displacements to be tracked, even in the millimeter or submillimeter scale, for user control actions even when those actions are optically occluded or obscured, such when a user's own clothes, game tool, or fingers occlude an action or an action is obscured due to darkness or varying light. Further, these techniques enable fine resolution and real-time control, unlike conventional RF-tracking or optical-tracking techniques.

This summary is provided to introduce simplified concepts concerning advanced gaming and virtual reality control using radar, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for advanced gaming and virtual reality control using radar are described with reference to the following drawings. The same numbers are used throughout the drawings to reference like features and components.

DETAILED DESCRIPTION

Overview

Figure 1:
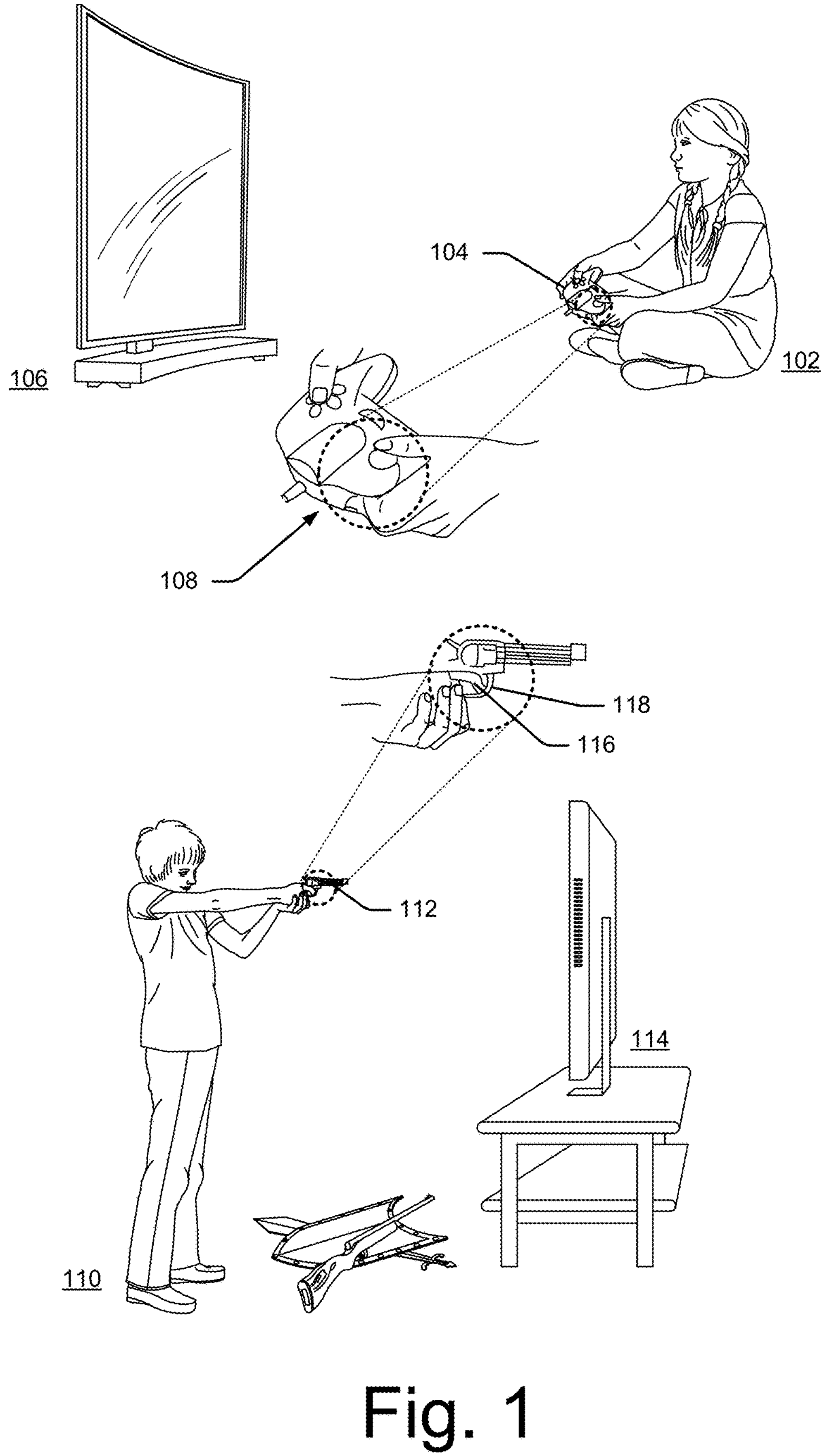
FIG. 1 illustrates two example cases in which advanced gaming and VR control using radar can be used, a user playing a video game using a mock controller and a user playing another game with a mock weapon.

Techniques are described herein that enable advanced gaming and virtual reality control using radar. These techniques enable small motions and displacements to be tracked, even in the millimeter or submillimeter scale, for user control actions even when those actions are optically occluded or obscured.

Consider, for example, a conventional optical or IR camera-enabled tracking system. This conventional system does not permit a user to use small motions or objects for control, such as just a fingertip, instead the user makes large body motions to control a game. And, for the VR world, a user represented by these conventional systems will not show finger orientation, finger movement, clothing movement or detail, as the resolution and these conventional optical or IR cameras is simply insufficient. Further still, any actions or parts of the person that are optically obscured from the camera will not be shown or shown correctly, which further limits this conventional technique.

Consider, as a second example, a conventional RF system for tracking motions and objects. The resolution of these conventional RF system is constrained by its antenna-beam width and bandwidth, both of which are based on the hardware of the conventional radar system. While somewhat better resolution can be obtained through multiple antennas, this increases complexity and cost while increasing lag-time between an action and that action being shown or its control made to the game or VR world. Even with a dozen antennas, the resolution is inferior to a single antenna using the disclosed advanced gaming and VR techniques.

In contrast to these inferior conventional techniques, consider techniques for advanced gaming and VR control using radar, which overcome hardware limitations of conventional radar systems and can recognize optically occluded or obscured motions. Consider two examples illustrated in FIG. 1. In the first, a user 102 is using a mock game controller 104 to play a video game on a computing device 106. This mock game controller 104 does not need any electronics, control capabilities, or communication capabilities by which to control the game. Further the mock game controller 104 can be obscured by being in a dark room or having shading where some part of the controller is well lit but others are dark, such as obscured portion 108. Note that in turning the mock controller 104 toward her left hand and down, that the obscured portion 108 is likely to be less-well lighted, as well as partially occluded from a radar field emitted from the computing device 106. Even so, the techniques permit the user 102 to play the game with fine motion, real-time control.

In the second example, a user 110 is using a mock weapon 112 to play a video game on computing device 114. Assume that this game is a "first person shooter" video game where the user 110 is fighting against a legion of zombies. Like many of these types of games, a player can see an oft-clumsy avatar approximation of his or her arms and feet, as well as the surrounding game world. The player can pick up supplies, tools, and weapons, which is one of the central parts of the game. In contrast to current techniques, these advanced techniques can permit the player to use and see his or her micro motions and small objects-such as a player's own arms, own hands, own feet (or an accurate representation) and their actual movements. In addition, note that the user's right index finger 116 is obscured by a trigger guard 118 of the mock weapon 112. Even so, the advanced techniques enable control through movement of the user's right index finger 116, obscured or otherwise.

The level of motion and orientation permitted by these advanced techniques can even permit the player to see his or her own self in the game world (or VR world in the case of a helmet or visor being worn), rather than a blockish avatar. Further, the player can now pick up actual mock tools and weapons and use them-even if those weapons or tools have no control capabilities. If, in the game world, a weapon is sitting on the ground, a player can pick up in the real world a plastic version of this weapon or even a toy from around the house, like a nerf gun, and use it in the game. The fine motions and ability to overcome occlusions can track the player's finger moving on the plastic trigger even when it is occluded by the weapon while also tracing movement of the weapon to aim at the zombie. All of this can be accurately and precisely shown in the VR world or game world, and enable control in the VR world or game. When the player picks up the plastic weapon, points it at the zombie, and pulls the trigger, the picking up, the pointing, and the fine motion of pulling the trigger, all can tracked by these advanced techniques.

This document now turns to an example computing device in which advanced gaming and virtual reality control using radar can be used, and then follows with an example computing device, an example radio field and occluded portion of a user's hand, a method, example RF wave propagations, and ends with an example computing system.

Example Computing Device

Figure 2:
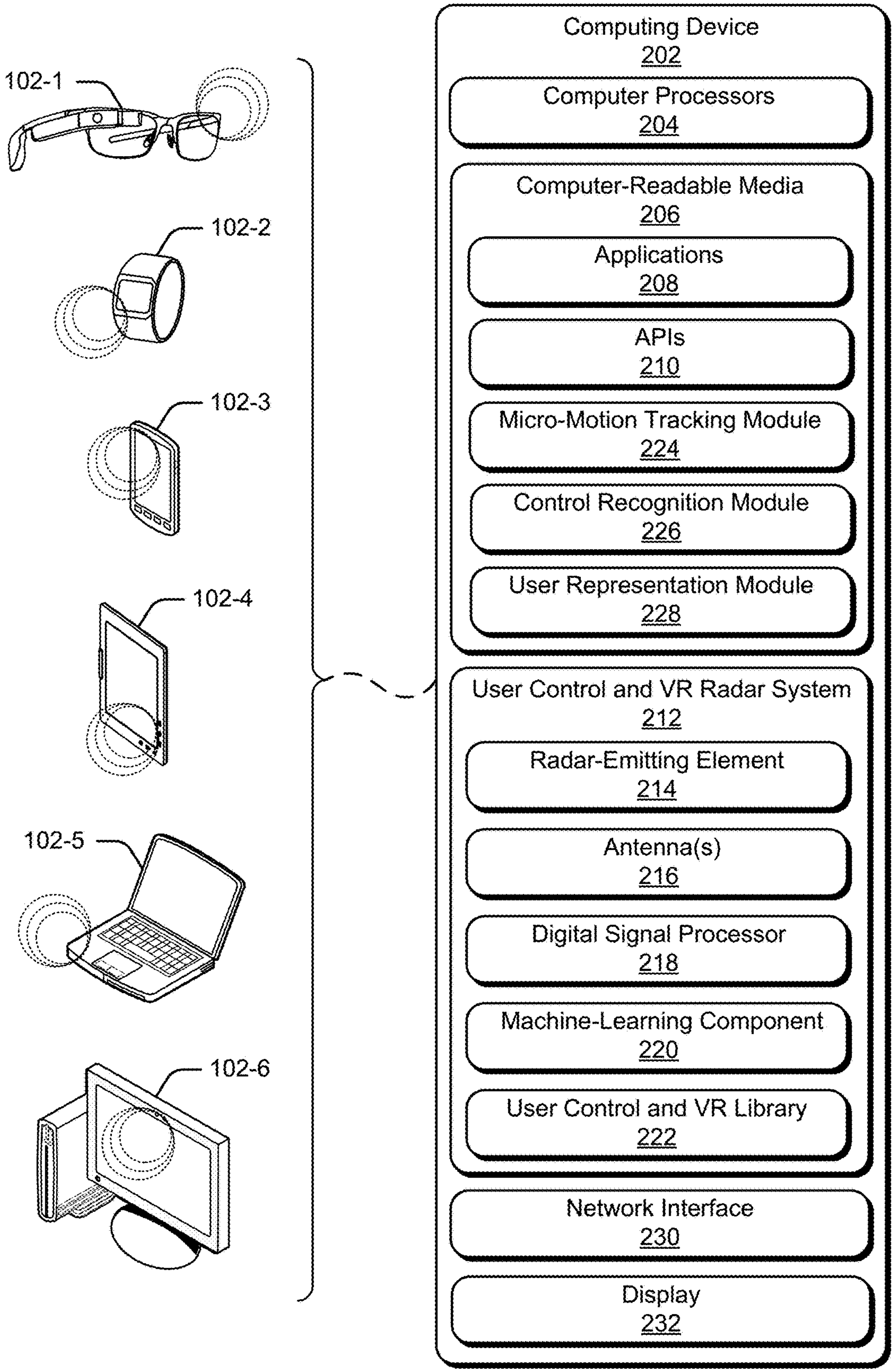
FIG. 2 illustrates an example implementation of the computing devices of FIG. 1 in greater detail, including setting out a radar system and various modules enabling the techniques.

Having generally described example uses of advanced gaming and VR control user radar, now consider FIG. 2, which illustrates an example implementation of the computing devices of FIG. 1 in greater detail. Computing device 202 represents any suitable type of computing device in which various embodiments can be implemented. In this example, various devices include, by way of example and not limitation: smart glasses 202-1, smart watch 202-2, mobile phone 202-3, tablet 202-4, laptop 202-5, and desktop computer 202-6. It is to be appreciated that these are merely examples for illustrative purposes, and that any other suitable type of computing device can be utilized without departing from the scope of the claimed subject matter, such as a netbook, dedicated gaming console, a lighting system, or an audio system.

The computing device 202 includes one or more computer processors 204 and computer-readable media 206. Applications 208 and/or an operating system (not shown) embodied as computer-readable instructions on the computer-readable media 206 can be executed by the processors 204 to invoke or interface with some or all of the functionalities described herein, such as through user control and VR Application Programming Interfaces (APIs) 210. These applications 208 may include game applications or virtual reality programs, through other non-game and non-VR programs may instead by used, such as to control media, web browsing, and so forth.

The user control and VR APIs 210 (APIs 210) provide programming access into various routines and functionality incorporated into user control and VR radar system 212 (radar system 212). In some embodiments, the APIs 210 provide high-level access into the radar system 212 in order to abstract implementation details and/or hardware access from a calling program, request notifications related to identified events, query for results, and so forth. The APIs 210 can also provide low-level access to the radar system 212, where a calling program can control direct or partial hardware configuration of the radar system 212. In some cases, the APIs 210 provide programmatic access to input configuration parameters that configure transmit signals and/or select VR or user-control recognition algorithms. These APIs enable programs, such as the applications 208, to incorporate the functionality provided by the radar system 212 into executable code. For instance, the applications 208 can call or invoke APIs 210 to register for, or request, an event notification when a particular micro-motion user control has been detected, enable or disable wireless gesture recognition in the computing device 202, and so forth. At times, the APIs 210 can access and/or include low-level hardware drivers that interface with hardware implementations of the radar system 212. Alternately or additionally, the APIs 210 can be used to access various algorithms that reside on the radar system 212 to configure algorithms, extract additional information (such as 3D tracking information, angular extent, reflectivity profiles from different aspects, correlations between transforms/features from different channels), change an operating mode of the radar system 212, and so forth.

The radar system 212 is shown separate from the computer-readable media 206, though it may contain computer-readable instructions. Thus, the radar system 212 can be implemented in part as a chip embedded within the computing device 202, such as a System-on-Chip (SoC), one or more Integrated Circuits (ICs), as a processor with embedded processor instructions, or configured to access processor instructions stored in memory, as hardware with embedded firmware, a printed circuit board with various hardware components, or any combination thereof. Here, the radar system 212 includes a radar-emitting element 214, one or more antennas 216, a digital signal processor 218, a machine-learning component 220, and a user-control and VR library 222. In conjunction with micro-motion tracking module 224, control recognition module 226, and/or user representation module 228 (each described below), the radar system 212 can enable advanced gaming and virtual reality control, even for millimeter-scale and occluded or obscured movements.

Generally, the radar-emitting element 214 is configured to provide a radar field. The radar field is configured to at least partially reflect off a target object. The radar field can also be configured to penetrate fabric or other obstructions and reflect from human tissue, such as a gaming implement (e.g., a mock game controller, weapon, or tool). These fabrics or obstructions can include wood, glass, plastic, cotton, wool, nylon and similar fibers, and so forth, while reflecting from human tissues, such as a person's hand. The radar field may also reflect from objects, such as a part of a game controller, trigger on a mock weapon, or button on a mock tool to discern small motions, or even larger motions, such as movement of a tool or pointing of a mock weapon.

A radar field can be a small size, such as 1 millimeter to 10 centimeters, moderate, such as 10 centimeters to 1.5 meters, or moderately large, such as 0.5 to 8 meters (or larger). It is to be appreciated that these sizes are merely for discussion purposes, and that any other suitable range can be used. The radar system 212 and modules 224, 226, or 228 can receive and process reflections of the radar field to provide large-body gestures based on reflections from human tissue caused by body, arm, or leg movements, either alone or in conjunction with small motions. Multiple radar fields can be used, or one field that enables determination of both small and large movements as noted below. Example uses of both large and small motion and position detection include determining a position of a user in three dimensions and large movements for the user, such as arm, leg, or a larger object's position or movement. These, along with small movements, such as fingers and the like, can be combined for realistic VR representations of the user, or for combined user control actions, like both pointing a mock weapon and pulling the trigger.

The antennas 216 receive RF signals. These antennas 216 (or a single antenna) can receive various types of reflections, such as a radar signal representing a superposition of reflections of two or more points within the radar field provided by the radar-emitting element 214 of the radar system 212. Often, one of the first or second points will be optically occluded. This optical occlusion resides between the antenna 216 and the point that is optically occluded. Example occlusions include mock or real game controllers, mock tools or weapons, food, gloves, clothing, books, other electronic devices, and so forth. Furthermore, often one of these points will be visually obscured. A point on an object is visually obscured with the lighting of that point is dark or otherwise difficult to optically capture, such as when the point is dark relative to at least another of the two or more points or to an ambient lighting of objects within the radar field. Consider, for example, the user 102 of FIG. 1, and her mock game controller 104. If she is sitting in a dark room, which is often the case for game playing, or even in a well-lighted room, as she moves the controller and her hands, buttons of the controller or her fingers can easily have substantial lighting changes, including those that make them difficult to optically capture.

These antennas 216 can be configured as a dipole antenna, a parabolic antenna, a helical antenna, a monopole antenna, and so forth. In some embodiments, the antennas 216 are constructed on-chip (e.g., as part of an SoC), while in other embodiments, the antennas 216 are separate components, metal, hardware, etc. that attach to, or are included within, the radar system 212. The placement, size, and/or shape of the antennas 212 can be chosen to enhance a specific transmission pattern or diversity scheme, such as a pattern or scheme designed to capture information about a micro-gesture performed by the hand, as further described above and below.

The digital signal processor 218 generally represents digitally capturing and processing a signal. For instance, the digital signal processor 218 samples analog RF signals received by the antennas 216 to generate digital samples that represents the RF signals, and then processes these samples to extract information about the target object. Alternately or additionally, the digital signal processor 218 controls the configuration of signals generated and transmitted by the radar-emitting element 214 and/or antennas 216, such as configuring a plurality of signals to form a specific diversity scheme like a beamforming diversity scheme. In some cases, the digital signal processor 218 receives input configuration parameters that control an RF signal's transmission parameters (e.g., frequency channel, power level), such as through the APIs 210. In turn, the digital signal processor 218 modifies the RF signal based upon the input configuration parameter. At times, the signal processing functions of the digital signal processor 218 are included in a library of signal processing functions or algorithms that are also accessible and/or configurable via the APIs 210. The digital signal processor 218 can be implemented in hardware, software, firmware, or any combination thereof.

Among other things, the machine-learning component 220 receives information processed or extracted by the digital signal processor 218, and uses that information to classify or recognize various aspects of the target object. In some cases, the machine-learning component 220 applies one or more algorithms to probabilistically determine which gesture has occurred given an input signal and previously learned gesture features. As in the case of the digital signal processor 218, the machine-learning component 220 can include a library of multiple machine-learning algorithms, such as a Random Forrest algorithm, deep-learning algorithms (e.g., artificial neural network algorithms, convolutional neural net algorithms), clustering algorithms, Bayesian algorithms, and so forth. The machine-learning component 220 can be trained on how to identify various gestures using input data that consists of example gesture(s) to learn. In turn, the machine-learning component 220 uses the input data to learn what features can be attributed to a specific gesture. These features are then used to identify when the specific gesture occurs. In some embodiments, the APIs 210 can be used to configure the machine-learning component 220 and/or its corresponding algorithms.

The user control and VR library 222 represents data used by the digital signal processor 218, the machine-learning component 220, and/or modules of FIG. 2, to identify a target object and/or user control actions or movements performed by the target object. For instance, the user control and VR library 222 can store signal characteristics, or characteristics about a target object that are discernable from a signal, such as a particular mock tool, mock controller, and so forth. By so doing, these objects can be tracked and also differentiated from other signals, such as those of a person arm or hand.

In addition, certain data stored in user control and VR library 222 may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Generally, the micro-motion tracking module 224 is configured to determine displacement of a point, or a relative displacement between points, determined from a radar signal representing reflections of one or more points within the radar field. In the case of a single point, the micro-motion tracking module 224 is configured to differentiate the point from other points, and then, based on an energy and velocity of the part of the signal associated with the point, determine a velocity of the point. In the case of multiple points, the micro-motion tracking module 224 is configured to determine a relative displacement between a first and second point of the multiple points. At least one of these points is associated with a user—in some cases a point is associated by being part of the user and in others the point is of something touched by the user, such as a mock controller (a lever or button), weapon (a trigger), or tool. Also, even though at least one of these points is occluded or obscured, the micro-motion tracking module 224 is able to spatially resolve the first and second points to provide at least a relative velocity or displacement of the points relative to each other or some third point. As noted in part above, the resolving can be at a resolution finer than a wavelength of the radar field provided by the radar system. Thus, as the wavelength is a constrain of the hardware of the system, the techniques described herein overcome that hardware constraint.

In more detail, the micro-motion tacking module 224 may determine a relative displacement by measuring a radial distance for each of the first and second points using a time delay between transmittal of the radar field and receiving the radar signal, measuring a radial velocity through an observed Doppler frequency for each of the first and second points, and measuring a reflected energy for each of the first and second points. This may be performed instead or in conjunction by components of the radar system 212 as well. Assume, for example, that the radar signal includes two sets of data, each set of data from one of two radar emitter-antenna pairs. In such a case, measuring the radial velocity can be through a range-Doppler map for one of the first or second points, per set of data. Also, this relative displacement can be calculated over a time series effective to track the first and second points over multiple relative displacements over time.

The micro-motion tracking module 224 may also, prior to determining the displacement, distinguish the point or points. In some cases this is performed by tracking temporal changes in the radar signal. This distinguishing can be performed by determine a micro-Doppler centroid for each point of interest, respectively. Thus, distinguishing points can be based on one of the first or second point having a different characteristic to a signal associated with the one of the first or second points than another signal associated with another of the first or second points.

In the case of occlusions, the micro-motion tracking module 224 can distinguish points prior to one of the points being optically occluded by tracking the points over time and then determining that one of the points is optically occluded based on an alteration of a characteristic of a signal associated with the optically occluded point. With this alteration known, further distinguishing and tracking can be performed based on the altered characteristic of the signal associated the occluded point. And, when the point that is occluded ceases to be occluded this change to the signal can also be noted, and back and forth. Thus, a finger on a mock controller can be tracked prior to occlusion, then the finger is occluded by the controller and tracked as an occluded point based on the altered signal, and then when no longer occluded by the controller the finger is tracked with the alteration no longer preset.

Figure 3:
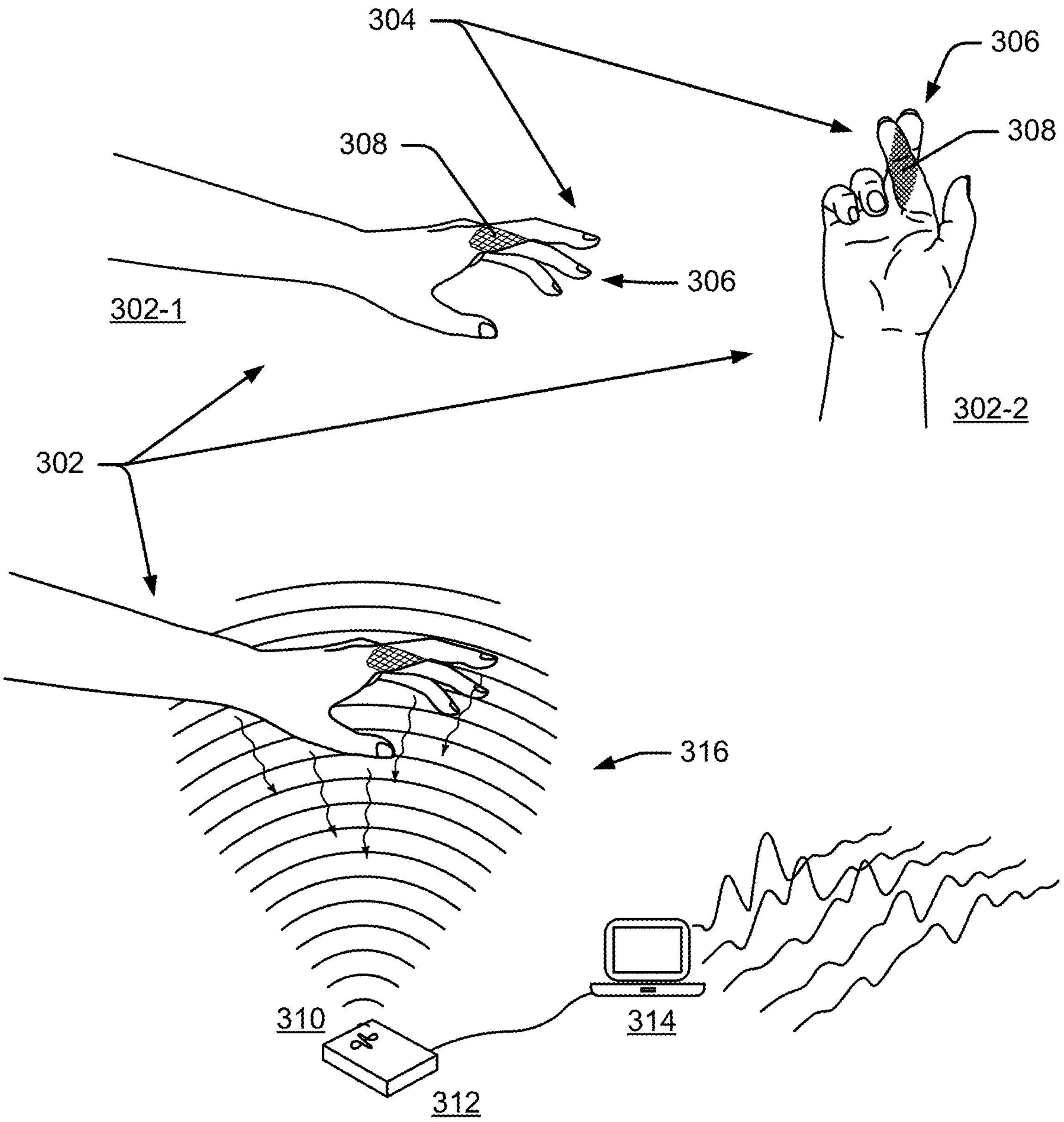
FIG. 3 illustrates a hand acting within a provided radar field, including an occluded portion of an index finger, as well as an example radar system and computing device.

Consider, for example, FIG. 3, which illustrates a user's hand 302 (shown in side view 302-1 and bottom view 302-2), an index finger 304, and a middle finger 306. Note that a portion of the index finger 304, occluded portion 308, is occluded relative to antenna 310 of radar system 312, shown as a peripheral of a computing device 314. The techniques, here through the micro-motion tracking module 224 of FIG. 2, can track even the occluded portion 308 of the index finger 304. Other aspects of FIG. 3 are described in the context of methods discussed below.

Returning to FIG. 2, generally, the control recognition module 226 is configured to determine a user control action based on the displacement of a point tracked by the micro-motion tracking module 224, or based on the relative displacement between two or more points also tracked by the micro-motion tracking module 224. This control action can be one on many different types and sizes of control actions, from fine motion, millimeter-scale control of a level or button or wheel on a mock game controller, a partially-occluded in-the-air gesture of a hand and fingers, a user pulling a trigger of a mock weapon, or larger-scale control, such as picking up a shield and moving it to block a game-opponent's sword strike, aiming a weapon at a zombie, or even jumping up to avoid a VR or game-world snare. The control recognition module 226 may recognize movements that are previously cataloged or simply determine the motion and pass the motion in a format usable by one of the applications 208 through the APIs 210. A movement of a trigger or putting a shield up to deflect a blow need not be cataloged or previously known gesture or action. Some actions and movements, however, are known and, in such cases, the user control and VR library 222 is used to determine the particular command or action desired by the movement. Thus, the user control need not be a particular gesture, but may instead by a movement, e.g., that the user 102 has pressed lever A forward ¼ or that the user 108 has moved the mock weapon 110 some number of degrees in a direction and then moved his index finger (pulling the trigger) some distance.

Generally, the user representation module 228 is configured to determine a user's representation based on a displacement or relative displacement of points associated with the user, which may include data that is solely in the millimeter scale but may also include data that is of a larger scale, whether provided by the radar system or other sensing system. Thus, the user representation module 228 may determine fine motions based on displacement or motion from the micro-motion tracking module 224, but may also, from the radar system or even an optical or IR camera, receiving data indicating a user's stance, position, or large motions.

In more detail, the user representation module 228 is configured to determine a location in three dimensions, or relative to a user, for one or more points based on a displacement or relative displacement between points. Data indicating a position of the user may also be used. Thus, assume that the user representation module 228 knows a user's general body location of feet, legs, arms, and centroid of a hand (but not detail of the hand). Based on this, the user representation module 228 may place the fingers for the hand based on the fine displacement from the radar system, and well as their fine, real-time movement for the hand. With this, the game or VR world is given sufficient information to accurately place the user and the user's fine motions in the game or VR world.

The computing device 202 may also include one or more network interfaces 230 for communicating data over wired, wireless, or optical networks and a display 232. The network interface 230 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. The display 232 can be integral with the computing device 202 or associated with it, such as with the desktop computer 202-6.

Having described the computing device 202 in accordance with one or more embodiments, now consider example methods for advanced gaming and VR control using radar.

Example Method

Figure 4:
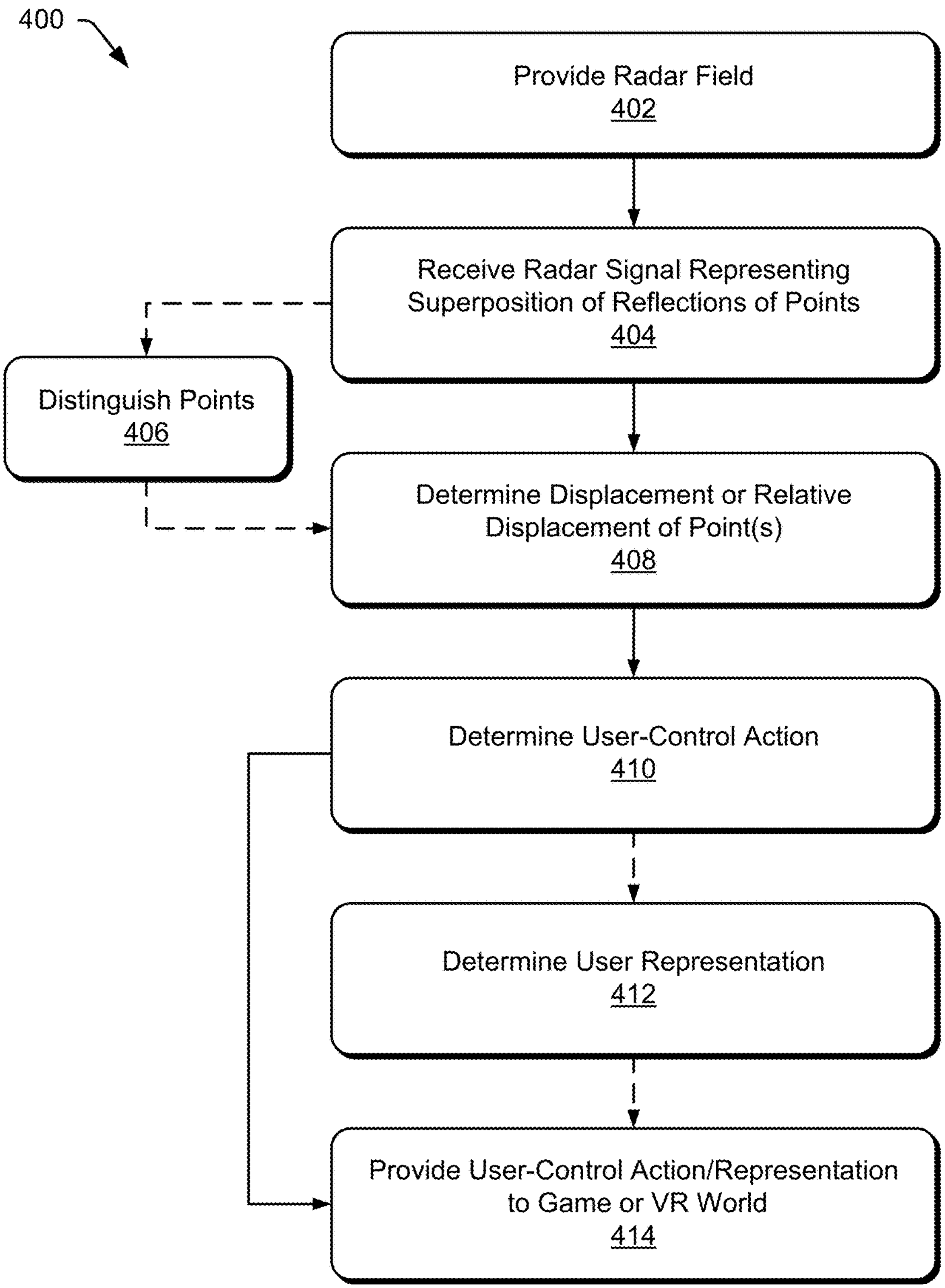
FIG. 4 illustrates an example method for advanced gaming and virtual reality control using radar.

FIG. 4 depicts a method 400 for advanced gaming and virtual reality control using radar. The method 400 receives a radar signal from a radar system in which a hand, object, or person's body makes a movement, determines a displacement at a finer resolution than conventional techniques permit based on the parameters of the radar system, and then, based on this displacement, determines user control actions or a user's representation, even in a millimeter or submillimeter scale. This method is shown as sets of blocks that specify operations performed but are not necessarily limited to the order or combinations shown for performing the operations by the respective blocks. In portions of the following discussion reference may be made to FIGS. 1-3 and 5-7, reference to which is made for example only. The techniques are not limited to performance by one entity or multiple entities operating on one device, or those described in these figures.

At 402, a radar field is provided, such as shown in FIG. 3 at radar field 316. The radar field can be provided by a simple radar system, including existing WiFi radar, and need not use complex, multi-emitter or multi-antenna, or narrow-beam scanning radars. Instead, a broad beam, full contiguous radar field can be used, such as 57-64 or 59-61 GHz, though other frequency bands, even sounds waves, can be used.

At 404, a radar signal representing a superposition of reflections of points within the radar field are received. As noted, at least one of the points can be optically occluded or obscured. In the case of an optical occlusion, an object resides between a radar antenna of the radar system and the point that is optically occluded. An example of this is shown in FIG. 3 at the occluded portion 308 of the index finger 304.

At 406, optionally and prior to block 408, two or more points are distinguished by tracking temporal changes in the radar signal. As noted above, this can be done by the micro-motion tracking module 224 by determining micro-Doppler centroids for the points.

At 408, a relative displacement between a point or multiple of the points is determined by spatially resolving the points. Note that a single displacement can be determined by the techniques, though very fine displacements can be determined more accurately or with fewer computing resources when the relative displacement between two points is determined.

At 410, a user control action is determined based on the displacement or relative displacement of the point or first and second points. Note that this can simply be provided effective to enable determination of the user control action. This is described in detail above. Also as noted in part above, a movement common to two points can be determined and this movement or displacement passed—this can aid in determining movement of a gaming implement. Thus, the techniques may determine, based on a movement of a centroid of the combination of the points, a movement of a game implement. If the techniques track a front of a mock weapon and track a user's finger the mock weapon, the common movement tracks the mock weapon, such as to point it at a particular spot on the displace of the computing device. The techniques can also determine a position of a user or larger objects, like an arm, leg, or tool. This position can be used with the fine motions to provide additional control or a more accurate representation of the user in the game or VR world.

At 412, optionally a representation of the user is determined, such as by the user representation module 228 described above. In such a case, a displacement of a point in three dimensions or relative to a user is determined.

At 414, the user control action and/or user representation is provided, such as to a game or VR application. In the case of the user control action, the relative or absolute displacement or velocity can be passed sufficient to enable the user's movement of him or herself, or a tool or object associated with him or her, to be passed to an application. In the case of a user representation, a position, e.g., in three dimension, or relative to the user is passed to a game or VR program to represent, in a game user interface or a virtual reality world, respectively, points associated with the user.

Through operations of method 400 and as noted above, relative dynamics are extracted from the radar signal representing the superposition of the reflections of multiple points within the radar field. These relative dynamics indicate a displacement of points relative one to another, from which micro-motions and larger movements can be determined. As noted above, in some cases extracting relative dynamics from the superposition determines micro-Doppler centroids for the points. These micro-Doppler centroids enable computationally light super-resolution velocity estimates to be determined. Thus, the computational resources needed are relatively low compared to conventional radar techniques, further enabling use of these RF-based micro-motion techniques in small or resource-limited devices, such as some wearable devices and appliances. Not only can these techniques be used on resource-limited devices, but the computationally light determination can permit faster response to a user action, such as in real time as a small, fine motion to move a dummy physical controller or maneuver a tool.

Further, the RF-based micro-motion techniques, by using micro-Doppler centroids, permits greater robustness to noise and clutter than use of Doppler profile peaks. To increase resolution, the micro-motion tracking module 224 may use the phase change of the radar signal to extract millimeter and sub-millimeter displacements for high-frequency movements of the points.

Example RF Signal Propagation in Radar-Based Gesture Devices

Having discussed example apparatuses and methods for advanced gaming and virtual reality control using radar, the discussion now turns to example manners in which RF radar can be used. Consider FIG. 5, which illustrates a simple example of RF source-wave propagation, and a corresponding reflected-wave propagation. The following discussion has been simplified, and is not intended to describe all technical aspects of RF source-wave propagation, reflected-wave propagation, or user-control action and micro-motion determination and detection techniques.

Environment 500 includes a source device 502 and an object 504. The source device 502 includes an emitter/receive antenna 506, which generally represents functionality configured to transmit and receive electromagnetic waves in the form of an RF signal. The emitter/receiver antenna 506 can be coupled to a source, such as a radar-emitting element (e.g., the radar-emitting element 214), to achieve transmission of a signal. In this example, the source device 502 transmits a series of RF pulses, illustrated here as the RF pulse 508-1, the RF pulse 508-2, and the RF pulse 508-3. As indicated by their ordering and distance from the source device 502, the RF pulse 508-3 is transmitted first in time, followed by the RF pulse 508-2, and then the RF pulse 508-1. For discussion purposes, these RF pulses have the same pulse width, power level, and transmission periodicity between pulses, but another suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. The environment 500 also illustrates the reflection of RF pulses 508-1, 2, and 3 reflecting off of the object 504, where an RF pulse 510-1 corresponds to a reflection originating from the RF pulse 508-1 reflecting off of the object 504, the RF pulse 510-2 corresponds to a reflection originating from the RF pulse 508-2, and so forth. In this simple case, the source device 502 and the object 504 are stationary, and the RF pulses 508-1, 2, and 3 are transmitted via a single antenna (the antenna 506) over a same RF channel, and are transmitted directly towards the object 504 with a perpendicular impact angle. Similarly, the RF pulses 5101, 2, and 3 are shown as reflecting directly back to the source device 502, rather than with some angular deviation. However, as one skilled in the art will appreciate, these signals can alternately be transmitted or reflected with variations in their transmission and reflection directions based upon the configuration of the source device 502, the object 504, transmission parameters, variations in real-world factors, and so forth. Upon receiving and capturing the RF pulses 5101, 2, and 3, the source device 502 can then analyze the pulses, either individually or in combination, to identify characteristics related to the object 504. For example, the source device 502 can analyze all of the received RF pulses to obtain temporal information and/or spatial information about the object 504. Accordingly, the source device 502 can use knowledge about a transmission signal's configuration (such as pulse widths, spacing between pulses, pulse power levels, phase relationships, and so forth), and further analyze a reflected RF pulse to identify various characteristics about the object 504, such as size, shape, movement speed, movement direction, surface smoothness, material composition, and so forth.

Figure 5:
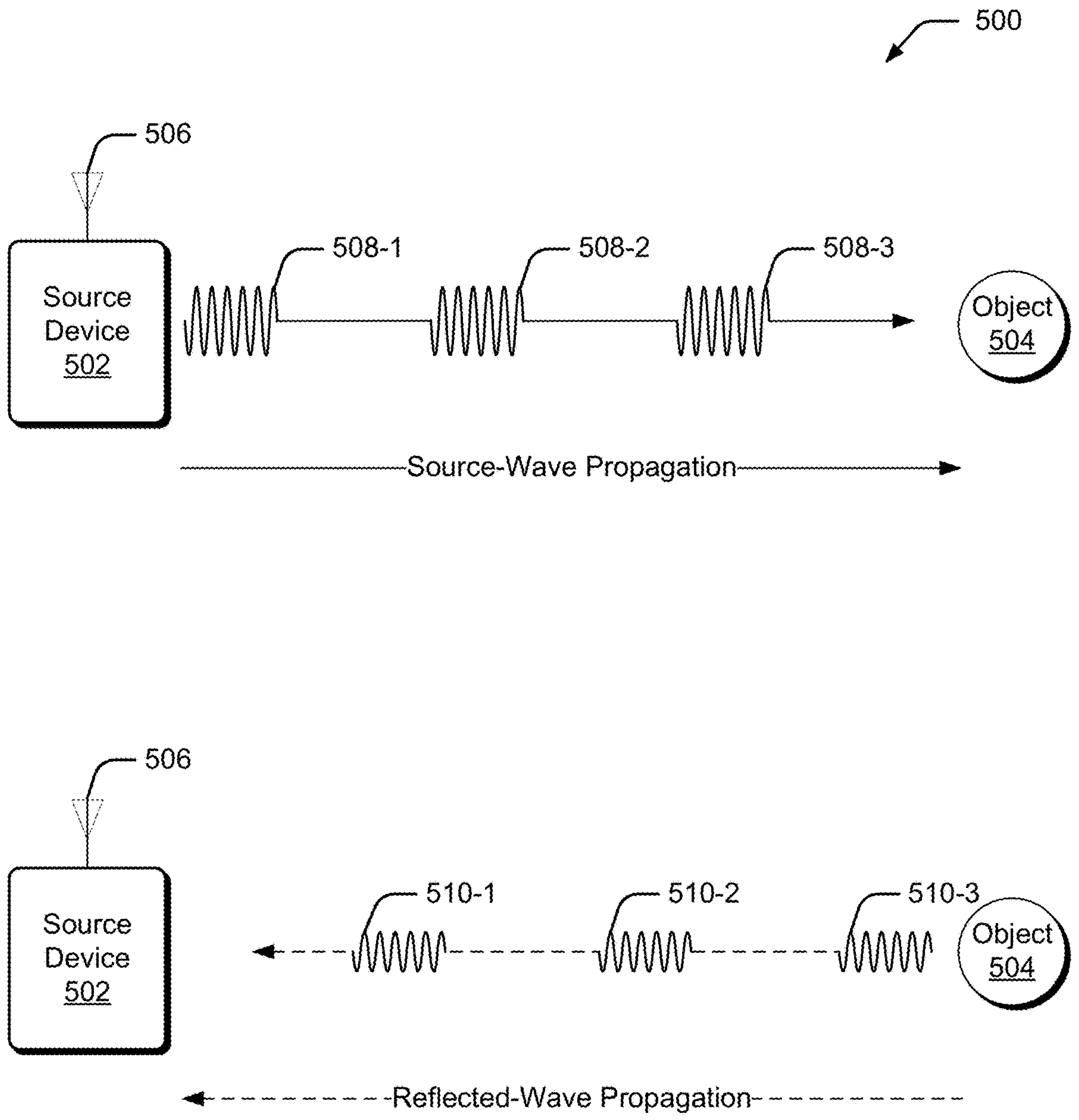
FIG. 5 illustrates a simple example of RF source-wave propagation and a corresponding reflected-wave propagation.
Figure 6:
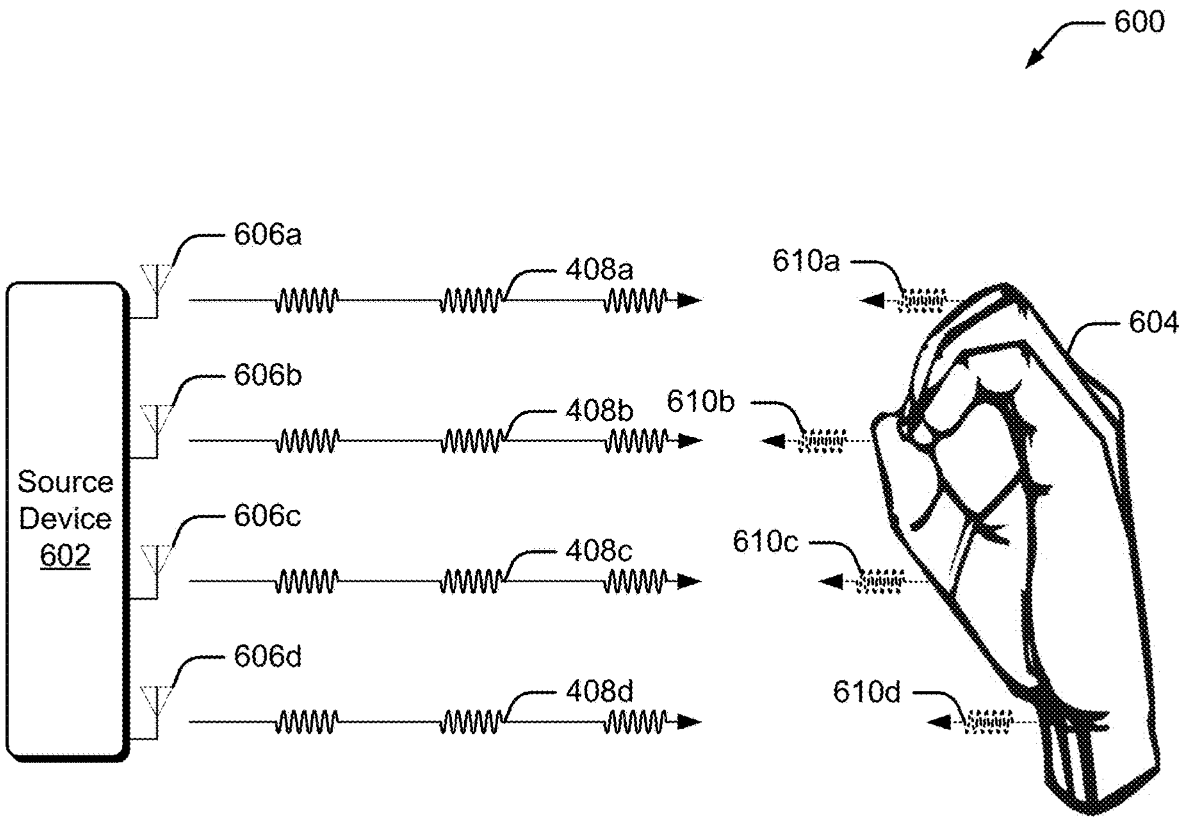
FIG. 6. illustrates an example environment in which multiple antenna are used to receive information about a target object.

Now consider FIG. 6, which builds upon the above discussion of FIG. 5. FIG. 6 illustrates example environment 600 in which multiple antenna are used to ascertain information about a target object. The environment 600 includes the source device 602 and a target object, shown here as hand 604. Generally speaking, the source device 602 includes antennas 606 to transmit and receive multiple RF signals. In some embodiments, the source device 602 includes the radar system 212 and modules of FIG. 2. The antennas 606 correspond to the antennas 216. While the source device 602 in this example includes four antennas, it is to be appreciated that any suitable number of antennas can be used. Each antenna of the antennas 606 is used by the source device 602 to transmit a respective RF signal (e.g., antenna 606-1 transmits RF signal 608-1, antenna 606-2 transmits RF signal 608-2, and so forth). As discussed above, these RF signals can be configured to form a specific transmission pattern or diversity scheme when transmitted together. For example, the configuration of the RF signals 608, as well as the placement of the antennas 606 relative to a target object, can be based upon beamforming techniques to produce constructive interference or destructive interference patterns, or alternately configured to support triangulation techniques. At times, the source device 602 configures the RF signals 608 based upon an expected information extraction algorithm, as further described below.

When the RF signals 608 reach the hand 604, they generate reflected RF signals 610. Similar to the discussion of FIG. 5 above, the source device 602 captures these reflected RF signals, and then analyzes them to identify various properties or characteristics of the hand 604, such as a millimeter-scale movement. For instance, in this example, the RF signals 608 are illustrated with the bursts of the respective signals being transmitted synchronously in time. In turn, and based upon the shape and positioning of the hand 604, the reflected signals 610 return to the source device 602 at different points in time (e.g., the reflected signal 610-2 is received first, followed by the reflected signal 610-3, then the reflected signal 610-1, and then the reflected signal 610-4). The reflected signals 610 can be received by the source device 602 in any suitable manner. For example, the antennas 606 can each receive all of the reflected signals 610, or receive varying subset combinations of the reflected signals 610 (e.g., the antenna 606-1 receives the reflected signal 610-1 and the reflected signal 610-4, the antenna 606-2 receives the reflected signal 610-1, the reflected signal 610-2, and the reflected signal 610-3, etc.). Thus, each antenna can receive reflected signals generated by transmissions from another antenna. By analyzing the various return times of each reflected signal, the source device 602 can determine shape and corresponding distance information associated with the hand 604. When reflected pulses are analyzed over time, the source device 602 can additionally discern movement. Thus, by analyzing various properties of the reflected signals, as well as the transmitted signals, various information about the hand 604 can be extracted, as further described below. It is to be appreciated that the above example has been simplified for discussion purposes and is not intended to be limiting.

As in the case of FIG. 5, FIG. 6 illustrates the RF signals 608 as propagating at a 90° angle from the source device 602 and in phase with one another. Similarly, the reflected signals 610 each propagate back at a 90° angle from the hand 604 and, as in the case of the RF signals 608, are in phase with one another. However, as one skilled in the art will appreciate, more-complex transmission signal configurations, and signal analysis on the reflected signals, can be utilized, examples of which are provided above and below. In some embodiments, the RF signals 608 can each be configured with different directional transmission angles, signal phases, power levels, modulation schemes, RF transmission channels, and so forth. These differences result in variations between the reflected signals 610. In turn, these variations each provide different perspectives of the target object which can be combined using data fusion techniques to yield a better estimate of the hand 604, how it is moving, its three-dimensional (3D) spatial profile, a corresponding user control action, and so forth.

Example Computing System

Figure 7:
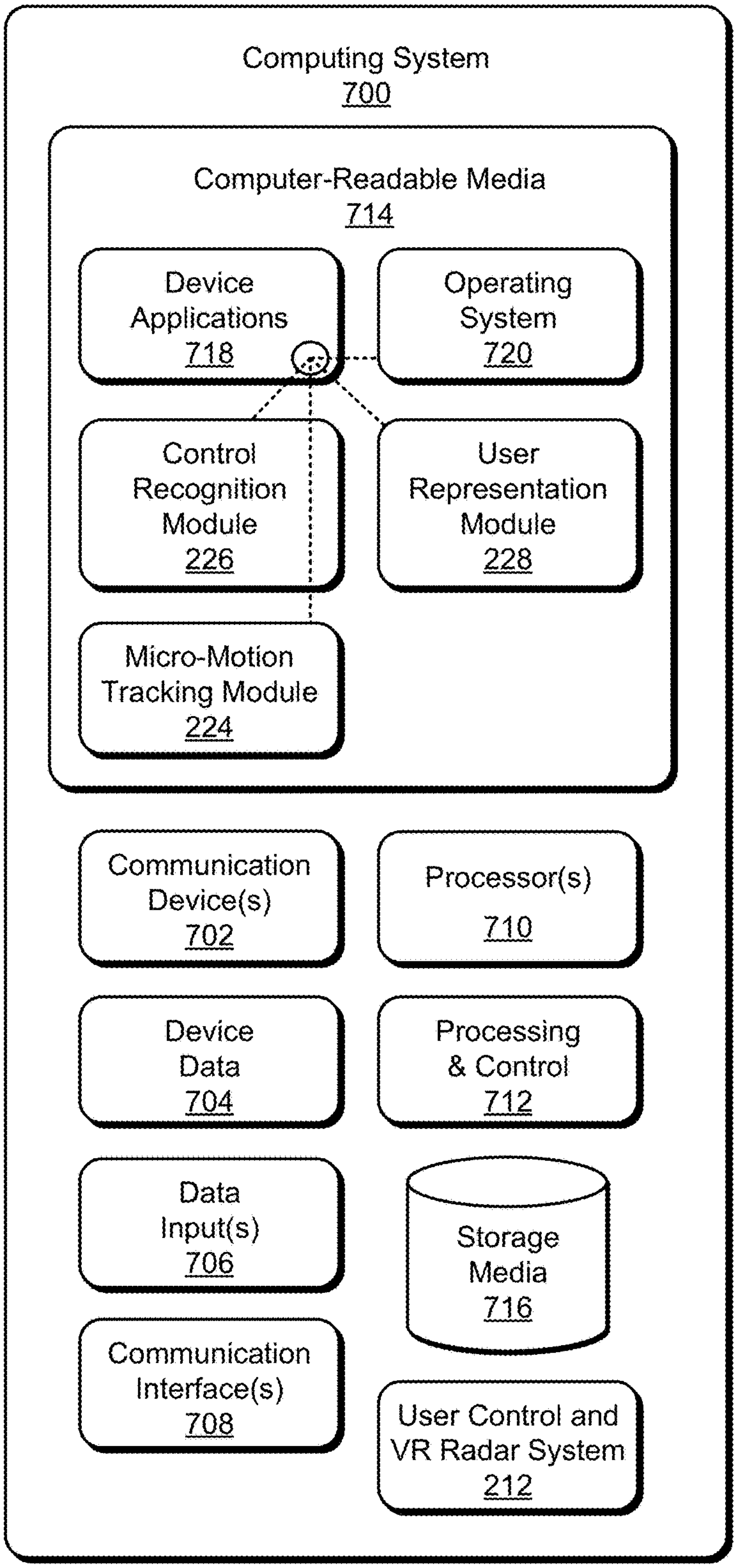
FIG. 7 illustrates an example computing system embodying, or in which techniques may be implemented that enable use of, advanced gaming and virtual reality control using radar.

FIG. 7 illustrates various components of an example computing system 700 that can be implemented as any type of client, server, and/or computing device as described with reference to the previous FIGS. 1-6 to implement advanced gaming and virtual reality control using radar.

The computing system 700 includes communication devices 702 that enable wired and/or wireless communication of device data 704 (e.g., received data, data that is being received, data scheduled for broadcast, data packets of the data, etc.). Device data 704 or other device content can include configuration settings of the device, media content stored on the device, and/or information associated with a user of the device (e.g., an identity of an actor performing an action). Media content stored on the computing system 700 can include any type of audio, video, and/or image data. The computing system 700 includes one or more data inputs 706 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

The computing system 700 also includes communication interfaces 708, which can be implemented as any one or more of a serial and/or parallel interface, a wireless interface, any type of network interface, a modem, and as any other type of communication interface. Communication interfaces 708 provide a connection and/or communication links between the computing system 700 and a communication network by which other electronic, computing, and communication devices communicate data with the computing system 700.

The computing system 700 includes one or more processors 710 (e.g., any of microprocessors, controllers, and the like), which process various computer-executable instructions to control the operation of the computing system 700 and to enable techniques for, or in which can be embodied, advanced gaming and virtual reality control using radar. Alternatively or in addition, the computing system 700 can be implemented with any one or combination of hardware, firmware, or fixed logic circuitry that is implemented in connection with processing and control circuits, which are generally identified at 712. Although not shown, the computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 700 also includes computer-readable media 714, such as one or more memory devices that enable persistent and/or non-transitory data storage (in contrast to mere signal transmission), examples of which include random access memory (RAM), non-volatile memory (e.g., any one or more of a read-only memory (ROM), flash memory, EPROM, EEPROM), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 700 can also include a mass storage media device (storage media) 716 and the user control and VR radar system 212 and its various components.

The computer-readable media 714 provides data storage mechanisms to store the device data 704, as well as various device applications 718 and any other types of information and/or data related to operational aspects of the computing system 700. For example, an operating system 720 can be maintained as a computer application with the computer-readable media 714 and executed on the processors 710. The device applications 718 may include a device manager, such as any form of a control application, software application, signal-processing and control module, code that is native to a particular device, an abstraction module or gesture module and so on. The device applications 718 also include system components, engines, or managers to implement advanced gaming and virtual reality control using radar, such as the micro-motion tracking module 224, the control-recognition module 226, and the user representation module 228.

The computing system 700 may also include, or have access to, one or more of radar systems, such as the radar system 212 having the radar-emitting element 214 and the antenna element 216. While not shown, one or more components of the micro-motion tracking module 224, the control recognition module 226, or the user representation module 228 may be operated, in whole or in part, through hardware or firmware.

CONCLUSION

Although techniques using, and apparatuses including, advanced gaming and virtual reality control using radar have been described in language specific to features and/or methods, it is to be understood that the subject of the appended claims is not necessarily limited to the specific features or methods described. Rather, the specific features and methods are disclosed as example implementations of ways in which to determine advanced gaming and virtual reality control using radar.

We claim:

1. A method comprising:

receiving a radar signal representing reflections of a radar field off two or more points over time, at least one of the two or more points being on a portion of an object, the object adjacent to a body of a user;

determining, based on the radar signal, relative Doppler-frequencies between the two or more points over time;

determining, based on the relative Doppler-frequencies, a user control action for an application associated with an electronic device; and directing, based on the user control action, the application associated with the electronic device to perform an action.

2. The method of claim 1, further comprising:

determining, based on the radar signal, locations of the two or more points over time; and directing, based on the determined locations, the application to alter a display associated with the application.

3. The method of claim 1, wherein:

determining relative Doppler-frequencies between the two or more points over time comprises determining a micro-Doppler centroid for each respective point of the two or more points; and the object adjacent to the body of the user is in contact with the body of the user.

4. The method of claim 1, further comprising determining, based on the relative Doppler-frequencies, relative velocities of the two or more points over time, and wherein determining the user control action is further based on the relative velocities.

5. The method of claim 4, further comprising integrating the relative velocities to determine relative displacements between the two or more points over time, and wherein determining the user control action is further based on the relative displacements.

6. The method of claim 5, wherein the relative displacements between the two or more points over time comprises millimeter-scale displacements.

7. The method of claim 1, further comprising spatially resolving at least a first point and a second point of the two or more points over time by determining:

radial distances for the first point and the second point based on respective time delays determined from the radar signal;

radial velocities for the first point and the second point based on respective Doppler-frequencies determined from the radar signal; and reflected energies for the first point and the second point determined from the radar signal.

8. The method of claim 1, wherein the object adjacent to the body of the user comprises at least one of:

a mock controller;

a mock tool;

a mock weapon;

a wearable accessory;

a handheld accessory;

clothing; or an electronic device.

9. The method of claim 1, wherein the object does not have control or communication capabilities.

10. The method of claim 1, wherein the user control action is determined based on a movement that is recognized by or associated with the application, the movement comprising a machine-learned movement or a previously-catalogued movement.

11. An apparatus comprising:

at least one processor;

a radar system configured to receive a radar signal representing reflections of a radar field off two or more points over time, at least one of the two or more points being on a portion of an object, the object adjacent to a body of a user; and a computer-readable storage medium having instructions stored thereon that, responsive to execution by the at least one processor, cause the at least one processor to:

determine, based on the radar signal, relative Doppler-frequencies between the two or more points over time;

determine, based on the relative Doppler-frequencies, a user control action for an application associated with the apparatus; and direct, based on the user control action, the application with the apparatus to perform an action.

12. The apparatus of claim 11, wherein the computer-readable storage medium further comprises instructions that, responsive to execution by the at least one processor, further cause the at least one processor to:

determine, based on the radar signal, locations of the two or more points over time; and direct, based on the determined locations, the application to alter a display associated with the application.

13. The apparatus of claim 11, wherein:

the radar system comprises one or more radar-emitting elements and one or more antennas configured to receive the radar signal, and wherein the radar system is further configured to provide the radar field prior to receipt of the radar signal; and the object adjacent to the body of the user is in contact with the body of the user.

14. The apparatus of claim 13, wherein the apparatus is a wearable device, and wherein another point of the two or more points is on a portion of a body of the user.

15. The apparatus of claim 11, wherein at least one of the user control action is passed to the application via at least one application programming interface (API).

16. The apparatus of claim 11, wherein the apparatus is configured as smart glasses, a smart watch, a virtual or augmented-reality system, a gaming system, a mobile phone, a tablet, a laptop, or a desktop computer.

17. The apparatus of claim 11, wherein:

the object is a mock controller, the mock controller being held by a hand of the user in a dark room;

a first point of the two or more points is a button of the mock controller; and a second point of the two or more points is a housing of the mock controller.

18. The apparatus of claim 17, wherein:

the user control action is determined based on the relative Doppler-frequencies between the button of the mock controller and the housing of the mock controller; and the action performed, based on the user control action, in the application comprises selecting an item.

19. The apparatus of claim 11, wherein:

the object is a mock weapon, the mock weapon being held by a hand of the user;

a first point of the two or more points is a tip of the mock weapon; and a second point of the two or more points is a handle of the mock weapon.

20. The apparatus of claim 19, wherein:

the user control action is determined based on the relative Doppler-frequencies between the tip of the mock weapon and the handle of the mock weapon; and the action performed, based on the user control action, in the application comprises picking up the mock weapon, moving the mock weapon, swinging the mock weapon, aiming the mock weapon, or actuating the mock weapon.

* * * * *